United States Patent
Berlinguette et al.

(10) Patent No.: US 12,006,580 B2
(45) Date of Patent: Jun. 11, 2024

(54) SYSTEMS AND METHODS FOR ELECTROCHEMICAL GENERATION OF SYNGAS AND OTHER USEFUL CHEMICALS

(71) Applicant: THE UNIVERSITY OF BRITISH COLUMBIA, Vancouver (CA)

(72) Inventors: Curtis Berlinguette, Vancouver (CA); Danielle Salvatore, Vancouver (CA); Tengfei Li, Vancouver (CA); Maxwell Goldman, Vancouver (CA); Eric Lees, Vancouver (CA)

(73) Assignee: THE UNIVERSITY OF BRITISH COLUMBIA, Vancouver (CA)

( * ) Notice: Subject to any disclaimer, the term of this patent is extended or adjusted under 35 U.S.C. 154(b) by 794 days.

(21) Appl. No.: 17/050,319

(22) PCT Filed: Apr. 25, 2019

(86) PCT No.: PCT/CA2019/050539
§ 371 (c)(1),
(2) Date: Oct. 23, 2020

(87) PCT Pub. No.: WO2019/204938
PCT Pub. Date: Oct. 31, 2019

(65) Prior Publication Data
US 2021/0123146 A1    Apr. 29, 2021

Related U.S. Application Data

(60) Provisional application No. 62/662,391, filed on Apr. 25, 2018.

(51) Int. Cl.
C25B 1/23    (2021.01)
B01D 53/14   (2006.01)
(Continued)

(52) U.S. Cl.
CPC ............ *C25B 1/23* (2021.01); *B01D 53/1475* (2013.01); *B01D 53/62* (2013.01); *B01D 53/73* (2013.01);
(Continued)

(58) Field of Classification Search
CPC ......... C25B 1/00; C25B 1/23; B01D 53/1475; B01D 2252/602
See application file for complete search history.

(56) References Cited

U.S. PATENT DOCUMENTS 8,163,066 B2    4/2012  Eisenberger
8,535,502 B2    9/2013  Littau et al.
(Continued)

FOREIGN PATENT DOCUMENTS

CA    2950294 A1    12/2015
CN    102912374 A    2/2013
(Continued)

OTHER PUBLICATIONS

DE 102015209509 A1—translation (Year: 2015).*
(Continued)

*Primary Examiner* — Nicholas A Smith
(74) *Attorney, Agent, or Firm* — Oyen Wiggs Green & Mutala LLP

(57) ABSTRACT

Processes and apparatus for electrocatalytically converting carbon dioxide emissions and/or ambient carbon dioxide into useful chemicals are described. The process may include: removing carbon dioxide from ambient air through a carbon capture technique, supplying a carbonate or bicarbonate aqueous solution as cathode feed to a cathode of an electrolytic cell comprising a membrane electrode assembly which includes a bipolar membrane separating an anode from the cathode, and applying an electrical potential difference between the cathode and the anode of the membrane
(Continued)

electrode assembly to electrocatalytically reduce the carbonate or bicarbonate aqueous solution to carbon monoxide or another useful chemical.

24 Claims, 15 Drawing Sheets

(51) Int. Cl.
   | | |
   |---|---|
   | *B01D 53/62* | (2006.01) |
   | *B01D 53/73* | (2006.01) |
   | *C25B 1/02* | (2006.01) |
   | *C25B 9/19* | (2021.01) |
   | *C25B 15/08* | (2006.01) |

(52) U.S. Cl.
   CPC .................. *C25B 1/02* (2013.01); *C25B 9/19* (2021.01); *C25B 15/08* (2013.01); *B01D 2252/602* (2013.01); *B01D 2257/504* (2013.01)

(56) References Cited

U.S. PATENT DOCUMENTS

| | | | |
|---|---|---|---|
| 2009/0120288 A1 | 5/2009 | Lackner et al. | |
| 2010/0135865 A1* | 6/2010 | Constantz | C01F 5/24 |
| | | | 422/170 |
| 2012/0174778 A1 | 7/2012 | Eisenberger | |
| 2019/0127865 A1* | 5/2019 | Li | C25B 3/26 |
| 2021/0002775 A1* | 1/2021 | Matsumoto | C25B 11/037 |

FOREIGN PATENT DOCUMENTS

| | | | | |
|---|---|---|---|---|
| CN | 102912374 B | 4/2015 | | |
| CN | 106006554 A | 10/2016 | | |
| CN | 107868962 A | 4/2018 | | |
| CN | 108193228 A | 6/2018 | | |
| DE | 102015209509 A1 * | 11/2016 | ............... | C25B 1/00 |
| DE | 102016220297 A1 | 3/2018 | | |
| EP | 2163294 A1 | 3/2010 | | |
| KR | 10-2013-0083217 A | 7/2013 | | |
| WO | 2009012154 A2 | 1/2009 | | |
| WO | 2009048685 A1 | 4/2009 | | |
| WO | 2010022339 A2 | 2/2010 | | |
| WO | 2011056183 A1 | 5/2011 | | |
| WO | 2012055035 A1 | 5/2012 | | |
| WO | 2016039999 A1 | 3/2016 | | |
| WO | 2017014635 A1 | 1/2017 | | |
| WO | 2019049476 A1 | 3/2019 | | |
| WO | 2019051609 A1 | 3/2019 | | |

OTHER PUBLICATIONS

Chen, Y. et al., "Aqueous CO2 reduction at very low overpotential on oxide-derived Au nanoparticles" J. Am. Chem. Soc. 2012 (134) 19969-19972.

Chu, S. et al., "Tunable Syngas Production from CO2 and H2O in an Aqueous Photoelectrochemical Cell", Angewandte Chemie, vol. 55, issue 46, Nov. 7, 2016, 14262-14266.

Delacourt, C. et al., "Design of an Electrochemical Cell Making Syngas (CO+H2) from CO2 and H2O Reduction at Room Temperature", J. Electrochem. Soc. 155, B42-B49 (2008).

Dufek, E. J. et al., "Bench-scale electrochemical system for generation of CO and syn-gas", J. Appl. Electrochem. 41, 623-631 (2011).

Dunwell, M. et al., "The Central Role of Bicarbonate in the Electrochemical Reduction of Carbon Dioxide on Gold", J. Am. Chem. Soc. 139, 3774-3783 (2017).

Eisaman, M. D. et al., "CO2 separation using bipolar membrane electrodialysis", Energy & Environmental Science 2011, 4 (4), 1319-1328.

Gupta, N. et al., "Calculation for the cathode surface concentrations in the electrochemical reduction of CO2 in KHCO3 solutions", J. App. Electrochem. 36, 161-172 (2006).

He, J. et al., "Electrocatalytic Alloys for CO2 Reduction", ChemSusChem 11, 48-57 (2018).

Hofbauer, H. et al., "Report on gas cleaning for synthesis applications", ThermalNet (2007), Vienna, University of Technology Institute of Chemical Engineering.

Hori, Y. et al., "Electrolytic Reduction of Bicarbonate Ion at a Mercury Electrode", J. Electrochem. Soc. 130, 2387-2390 (1983).

Hu, G. et al., "Enzymatic carbon dioxide capture using a thermally stable carbonic anhydrase as a promoter in potassium carbonate solvents", Chemical Engineering Journal, vol. 307, Jan. 1, 2017, 49-55.

Keith, D.W. et al., "A Process for Capturing CO2 from the Atmosphere", Joule 2, 1573-1594, Aug. 15, 2018.

Kortlever, R. et al., "Electrochemical carbon dioxide and bicarbonate reduction on copper in weakly alkaline media", J. Sold State Electrochem. 17, 1843-1849 (2013).

Kulh, K. P. et al., "New insights into the electrochemical reduction of carbon dioxide on metallic copper surfaces", Energy Environ. Sci. 5, 7050-7059 (2012).

Kutz, R. B. et al., "Sustainion Imidazolium-Functionalized Polymers for Carbon Dioxide Electrolysis" Energy Technol. 5, 929-936 (2017).

Li, T. et al., "Electrolytic CO2 Reduction in Tandem with Oxidative Organic Chemistry", ACS Cent. Sci. 3, 778-783 (2017).

Li, Y. C. et al., "Electrolysis of CO2 to Syngas in Bipolar Membrane-Based Electrochemical Cells", ACS Energy Lett. 1, 1149-1153 (2016).

Ciao, P.-Q. et al., "Monodentate hydroxide as a super strong yet reversible active site for CO2 capture from high-humidity flue gas", Energy & Environmental Science 2015, 8 (3), 1011-1016.

Lin, S. et al., "Covalent organic frameworks comprising cobalt porphyrins for catalytic CO2 reduction in water", Science 349, 1208-1213 (2015).

Liu, M. et al., "Enhanced electrocatalytic CO2 reduction via field-induced reagent concentration", Nature 537, 382 (2016).

Mariano, R. G. et al., "Selective increase in CO2 electroreduction activity at grain-boundary surface terminations", Science 358, 1187-1192 (2017).

Min, X. et al., "Pd-catalyzed electrohydrogenation of carbon dioxide to formate: high mass activity at low overpotential and identification of the deactivation pathway", J. Am. Chem. Soc. 137, 4701-4708 (2015).

Qiao, J. et al., "A review of catalysts for the electroreduction of carbon dioxide to produce low-carbon fuels", Chem. Soc. Rev. 43, 631-675 (2014).

Rochelle, G. T., "Amine Scrubbing for CO2 Capture", Science, vol. 325, issue 5948, 1652-1654, Sep. 25, 2009.

Salvatore, D. A. et al., "Electrolysis of Gaseous CO2 to CO in a Flow Cell with a Bipolar Membrane", ACS Energy Lett. 3, 149-154 (2018).

Singh, M. R. et al., "Hydrolysis of Electrolyte Cations Enhances the Electrochemical Reduction of CO2 over Ag and Cu", J. Am. Chem. Soc. 138, 13006-13012 (2016).

Spichiger-Ulmann, M. et al., "Electrochemical reduction of bicarbonate ions at a bright palladium cathode", J. Chem. Soc. Lond. Faraday Trans. 1 (81), 713-716 (1985).

Sreekanth, N. et al., "Selective reduction of CO2 to formate through bicarbonate reduction on metal electrodes: hew insights gained from SG/TC mode of SECM", Chem. Commun. 50, 11143-11146 (2014).

Weekes, D. M. et al., "Electrolytic CO2 Reduction in a Flow Cell", Acc. Chem. Res. (2018), doi: 10.1021/acs.accounts.8b00010.

Whipple, D. T. et al., "Microfluidic Reactor for the Electrochemical Reduction of Carbon Dioxide: The Effect of pH", Electrochem. Solid-State Lett. 13, B109-B111 (2010).

Wiebe, R. et al., "The Solubility of Carbon Dioxide in Water at Various Temperatures from 12 to 40° and at Pressures to 500 Atmospheres. Critical Phenomena", J. Am. Chem. Soc. 62, 815-817 (1940).

Willauer, H. D. et al., "Development of an Electrochemical Acidification Cell for the Recovery of CO2 and H2 from Seawater II. Evaluation of the Cell by Natural Seawater", Industrial & Engineering Chemistry Research 2012, 51 (34), 11254-11260.

(56) References Cited

OTHER PUBLICATIONS

Wuttig, A. et al., "Bicarbonate Is Not a General Acid in Au-Catalyzed CO2 Electroreduction", Journal of the American Chemical Society 2017, 139 (47), 17109-17113.
Wuttig, A. et al., "Impurity Ion Complexation Enhances Carbon Dioxide Reduction Catalysis", ACS Cata.5, 4479-4484 (2015).
Yu, Y. et al., "Enzymatic conversion of CO2 to bicarbonate in functional mesoporous silica", Microporous and Mesoporous Materials, vol. 153, May 1, 2012, 166-170.
Zhong, H. et al., "Effect of CO2 Bubbling into Aqueous Solutions Used for Electrochemical Reduction of CO2 for Energy Conversion and Storage", J. Phys. Chem. C 119, 55-61 (2015).
Zhu, S. et al., "Direct Observation on Reaction Intermediates and the Role of Bicarbonate Anions in CO2 Electrochemical Reduction Reaction on Cu Surfaces", J. Am. Chem. Soc. 139, 15664-15667 (2017).
Shah, A.H. et al., "Revisiting Electrochemical Reduction of CO2 on Cu Electrode: Where Do We Stand about the Intermediates?", J. Phys. Chem. C 2018, 122, 18528-18536.
Hu, G. et al., "Screening Amino Acid Salts as Rate Promoters in Potassium Carbonate Solvent for Carbon Dioxide Absorption", Energy Fuels 2017, 31, 4280-4286.

\* cited by examiner

SYSTEMS AND METHODS FOR ELECTROCHEMICAL GENERATION OF SYNGAS AND OTHER USEFUL CHEMICALS

CROSS-REFERENCE TO RELATED APPLICATIONS

This application claims priority from U.S. Application No. 62/662,391 filed 25 Apr. 2018. For the purposes of the United States, this application claims the benefit under 35 U.S.C. § 119 of U.S. application No. 62/662,391 filed 25 Apr. 2018 and entitled DIRECT ELECTROLYTIC CONVERSION OF BICARBONATE AND CARBONATE INTO CO IN A FLOW CELL, which is hereby incorporated herein by reference for all purposes.

FIELD

This application relates to electrochemical cells and to electrochemical methods for generating syngas or other useful chemicals. The invention has example application to carbon capture from flue gas or other sources.

BACKGROUND

Rising atmospheric $CO_2$ levels are a cause of global warming. Carbon capture systems aim to capture $CO_2$ emissions from combustion or other processes so that the amount of $CO_2$ that is released to the atmosphere is reduced. Captured $CO_2$ may be stored (e.g. by injecting the $CO_2$ into selected geological formations) or used for other purposes.

Promising technologies for capture of $CO_2$ involve promoting a chemical reaction in which gaseous $CO_2$ is converted to a carbonate or bicarbonate in solution. The captured $CO_2$ can then be recovered in a high temperature (several hundred ° C.) thermal process. For example a calcination process for recovering $CO_2$ may require temperatures above 900° C. The high temperature processing requires significant input of energy which reduces the overall energy efficiency of such carbon capture processes. For example, an energy input of about 10 GJ may be required per ton of $CO_2$.

A problem which needs to be addressed to make electrochemical conversion of $CO_2$ emissions economically viable on an industrial scale is that current methods are inefficient. The saturation point of aqueous $CO_2$ fundamentally limits the maximum current density that can be achieved for $CO_2$ reduction in the bulk liquid phase. A particular challenge is to provide ways for accessing electrolytically-reduced carbon products at higher current densities (e.g. current densities of at least 100 $mA/cm^2$).

The following references describe various electrochemical systems including various approaches to electrochemical reduction of carbon dioxide:
1. Kuhl, K. P., Cave, E. R., Abram, D. N. & Jaramillo, T. F. New insights into the electrochemical reduction of carbon dioxide on metallic copper surfaces. Energy Environ. Sci. 5, 7050-7059 (2012).
2. Qiao, J., Liu, Y., Hong, F. & Zhang, J. A review of catalysts for the electroreduction of carbon dioxide to produce low-carbon fuels. Chem. Soc. Rev. 43, 631-675 (2014).
3. Lin, S. et al. Covalent organic frameworks comprising cobalt porphyrins for catalytic $CO_2$ reduction in water. Science 349, 1208-1213 (2015).
4. Liu, M. et al. Enhanced electrocatalytic $CO_2$ reduction via field-induced reagent concentration. Nature 537, 382 (2016).
5. Li, T., Cao, Y., He, J. & Berlinguette, C. P. Electrolytic $CO_2$ Reduction in Tandem with Oxidative Organic Chemistry. ACS Cent. Sci. 3, 778-783 (2017).
6. Mariano, R. G., McKelvey, K., White, H. S. & Kanan, M. W. Selective increase in $CO_2$ electroreduction activity at grain-boundary surface terminations. Science 358, 1187-1192 (2017).
7. He, J., Johnson, N. J. J., Huang, A. & Berlinguette, C. P. Electrocatalytic Alloys for $CO_2$ Reduction. ChemSusChem 11, 48-57 (2018).
8. Salvatore, D. A. et al. Electrolysis of Gaseous $CO_2$ to CO in a Flow Cell with a Bipolar Membrane. ACS Energy Lett. 3, 149-154 (2018).
9. Li, Y. C. et al. Electrolysis of $CO_2$ to Syngas in Bipolar Membrane-Based Electrochemical Cells. ACS Energy Lett. 1, 1149-1153 (2016).
10. Weekes, D. M., Salvatore, D. A., Reyes, A., Huang, A. & Berlinguette, C. P. Electrolytic $CO_2$ Reduction in a Flow Cell. Acc. Chem. Res. (2018). doi:10.1021/acs.accounts.8b00010
11. Whipple, D. T., Finke, E. C. & Kenis, P. J. A. Microfluidic Reactor for the Electrochemical Reduction of Carbon Dioxide: The Effect of pH. Electrochem. Solid-State Lett. 13, B109-6111 (2010).
12. Kutz, R. B. et al. Sustainion Imidazolium-Functionalized Polymers for Carbon Dioxide Electrolysis. Energy Technol. 5, 929-936 (2017).
13. Min, X. & Kanan, M. W. Pd-catalyzed electrohydrogenation of carbon dioxide to formate: high mass activity at low overpotential and identification of the deactivation pathway. J. Am. Chem. Soc. 137, 4701-4708 (2015).
14. Zhong, H., Fujii, K., Nakano, Y. & Jin, F. Effect of $CO_2$ Bubbling into Aqueous Solutions Used for Electrochemical Reduction of $CO_2$ for Energy Conversion and Storage. J. Phys. Chem. C 119, 55-61 (2015).
15. Kortlever, R., Tan, K. H., Kwon, Y. & Koper, M. T. M. Electrochemical carbon dioxide and bicarbonate reduction on copper in weakly alkaline media. J. Sold State Electrochem. 17, 1843-1849 (2013).
16. ori, Y. & Suzuki, S. Electrolytic Reduction of Bicarbonate Ion at a Mercury Electrode. J. Electrochem. Soc. 130, 2387-2390 (1983).
17. Spichiger-Ulmann, M. & Augustynski, J. Electrochemical reduction of bicarbonate ions at a bright palladium cathode. J. Chem. Soc. Lond. Faraday Trans. 1 81, 713-716 (1985).
18. Sreekanth, N. & Phani, K. L. Selective reduction of $CO_2$ to formate through bicarbonate reduction on metal electrodes: new insights gained from SG/TC mode of SECM. Chem. Commun. 50, 11143-11146 (2014).
19. Dunwell, M. et al. The Central Role of Bicarbonate in the Electrochemical Reduction of Carbon Dioxide on Gold. J. Am. Chem. Soc. 139, 3774-3783 (2017).
20. Zhu, S., Jiang, B., Cai, W.-B. & Shao, M. Direct Observation on Reaction Intermediates and the Role of Bicarbonate Anions in $CO_2$ Electrochemical Reduction Reaction on Cu Surfaces. J. Am. Chem. Soc. 139, 15664-15667 (2017).
21. Wuttig, A., Yoon, Y., Ryu, J. & Surendranath, Y. Bicarbonate Is Not a General Acid in Au-Catalyzed $CO_2$ Electroreduction. J. Am. Chem. Soc. 139, 17109-17113 (2017).

22. Dufek, E. J., Lister, T. E. & McIlwain, M. E. Bench-scale electrochemical system for generation of CO and syn-gas. J. Appl. Electrochem. 41, 623-631 (2011).
23. Delacourt, C., Ridgway, P. L., Kerr, J. B. & Newman, J. Design of an Electrochemical Cell Making Syngas (CO+ $H_2$) from $CO_2$ and $H_2O$ Reduction at Room Temperature. J. Electrochem. Soc. 155, B42-B49 (2008).
24. Wiebe, R. & Gaddy, V. L. The Solubility of Carbon Dioxide in Water at Various Temperatures from 12 to 40° and at Pressures to 500 Atmospheres. Critical Phenomena*. J. Am. Chem. Soc. 62, 815817 (1940).
25. Singh, M. R., Kwon, Y., Lum, Y., Ager, J. W. & Bell, A. T. Hydrolysis of Electrolyte Cations Enhances the Electrochemical Reduction of $CO_2$ over Ag and Cu. J. Am. Chem. Soc. 138, 1300613012 (2016).
26. Gupta, N., Gattrell, M. & MacDougall, B. Calculation for the cathode surface concentrations in the electrochemical reduction of $CO_2$ in $KHCO_3$ solutions. J. App. Electrochem. 36, 161-172 (2006).
27. Wuttig, A. & Surendranath, Y. Impurity Ion Complexation Enhances Carbon Dioxide Reduction Catalysis. ACS Cata.5, 4479-4484 (2015).

Despite the current depth of knowledge in the field of electrochemistry there remains a need for new practical and cost efficient ways to capture $CO_2$. There is also a need for new practical ways to create useful chemicals.

SUMMARY

This invention has a number of aspects. These include, without limitation:
  methods and apparatus for carbon capture;
  methods and apparatus for electrochemical conversion of captured waste carbon dioxide to useful materials; and
  methods and apparatus for electrocatalytic reduction of carbonates ($CO_3^{2-}$) and/or bicarbonates ($HCO_3^-$) to useful materials.

One aspect of the invention provides a carbon capture method comprising chemically reacting gaseous carbon dioxide to form bicarbonate and/or carbonate in an aqueous solution. The aqueous solution is supplied at a cathode of an electrochemical reactor comprising an anode and the cathode separated by a bipolar membrane. A potential difference is applied between the anode and the cathode to cause an electrochemical reaction yielding product gas comprising one or both of gas phase carbon dioxide and gas phase carbon monoxide. The product gas is subsequently separated from the aqueous solution.

In some embodiments:
  the aqueous solution supplied at the cathode comprises bicarbonate at a concentration of at least 3 moles/liter and/or
  the pressure of the aqueous solution at the cathode is 2 atmospheres or less;
  and/or
  the aqueous solution is be flowed through a cathode chamber of the electrochemical reactor; and/or
  the aqueous solution has a pH of at least 7 or at least 8; and/or
  the aqueous solution comprises a strong base; and/or
  the concentration of $CO_2$ in the aqueous solution is below 7 mM; and/or
  the pressure of the aqueous solution at the cathode of the electrochemical reactor is 2 atmospheres or less.

In some embodiments, hydrogen gas is generated at the cathode of the electrochemical reactor and the product gas comprises the hydrogen gas. The product gas may be a mixture of $CO_2$, CO and $H_2$ in some embodiments. Such mixture comprises no more than 50% $CO_2$ in some embodiments. The molar ratio of CO to $H_2$ in the product gas may be greater than 1 in some embodiments. The molar ratio of CO to $H_2$ in the product gas may be less than 1 in other embodiments.

In some embodiments, the composition of the product gas is controlled by adjusting a magnitude of the potential applied across the anode and the cathode. A current flowing in the electrochemical reactor as a result of the applied potential may have a current density at the cathode of at least 100 mA/cm$^2$.

Another aspect of the invention provides an apparatus for carbon capture. The apparatus comprises a contactor having a fluid inlet and a fluid outlet, the contactor configured to bring a gas comprising carbon dioxide into contact with an aqueous solution provided at the fluid inlet, an electrochemical reactor and a product gas separator. The electrochemical reactor comprises an anode and the cathode separated by a bipolar membrane and a power supply connected to apply a potential difference between the anode and the cathode. A cathode side of the electrochemical reactor comprises a fluid inlet and a fluid outlet wherein the fluid outlet of the contactor is in fluid communication with the fluid inlet of the electrochemical reactor such that the aqueous solution is delivered to the electrochemical reactor after contacting the gas. The product gas separator is located to collect product gas produced by the electrochemical reactor.

In some embodiments, the aqueous solution provided at the fluid inlet of the contactor comprises a strong base. In some embodiments the aqueous solution has a pH exceeding pH 8. For example the pH may be in the range of 8 to 10. The aqueous solution may comprise NaOH or KOH. The aqueous solution may optionally comprise catalyst that catalyzes reaction of $CO_2$ to yield carbonate or bicarbonate ions. The catalyst may, for example, comprise an enzyme catalyst such as a carbonic anhydrase. The enzyme catalyst may be operative at temperatures above 100° C.

The aqueous solution precipitates a carbonate and/or bicarbonate after contacting the gas in some embodiments. The concentration of carbonate and/or bicarbonate ions in the aqueous solution may, for example, be in the range of 0.5M to 3M.

some embodiments, the product gas separator comprises a conduit in fluid communication with the fluid inlet of the contactor. The conduit may be configured to circulate the aqueous solution back to the contactor after the product gas separator collects the product gas.

In some embodiments, the cathode comprises a gas diffusion layer. The gas diffusion layer may comprise materials selected from the group consisting of: a carbon felt, a carbon paper, a carbon cloth, and a sintered gas diffusion layer. The cathode is in contact with the bipolar membrane in some embodiments.

In some embodiments, the electrochemical reactor is operated at a temperature not exceeding 150° C. and/or not exceeding a boiling point of the aqueous solution. The electrochemical reactor is operated at ambient pressure in some embodiments.

Another aspect of the invention provides a method for processing a solution of bicarbonate or carbonate to yield one or more carbon compounds. The method comprises supplying an aqueous solution comprising bicarbonate and/or carbonate at a cathode of an electrochemical reactor comprising an anode and the cathode separated by a bipolar membrane; and applying a potential difference between the anode and the cathode to cause an electrochemical reaction yielding product gas. The product gas may comprise one or both of gas phase carbon dioxide and gas phase carbon monoxide. The method comprises separating the product gas from the aqueous solution. The electrochemical reactor is operated at a low pressure (e.g. a pressure not exceeding 1.5 atmospheres or 2 atmospheres).

Further aspects and example embodiments are illustrated in the accompanying drawings and/or described in the following description.

BRIEF DESCRIPTION OF THE DRAWINGS

The accompanying drawings illustrate non-limiting example embodiments of the invention.

DETAILED DESCRIPTION

Figure 1:
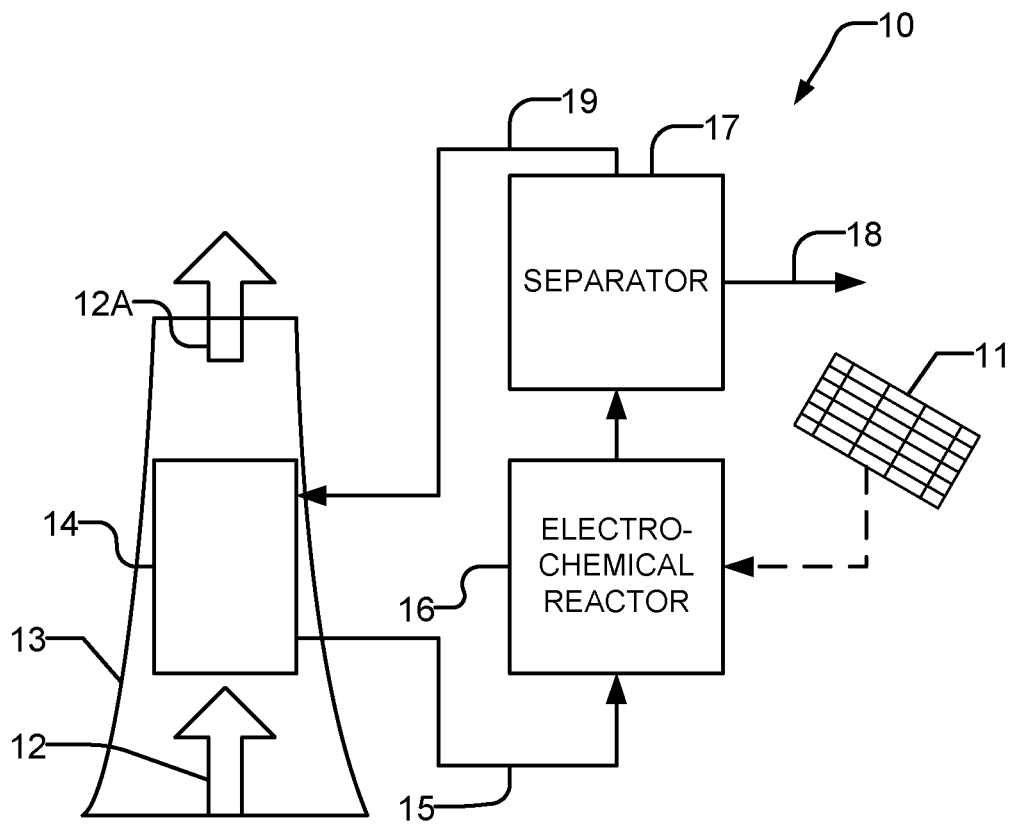
FIG. 1 is a block diagram illustrating carbon capture apparatus according to an example embodiment of the invention.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Definitions

"Bipolar membrane" or "BPM" is a membrane comprising plural layers including an anion exchange layer on one side and a cation exchange layer on another side. A bipolar membrane may comprise one or more layers between the anion exchange layer and the cation exchange layer. For example, an intermediate layer may comprise a catalyst which facilitates dissociation of water into protons and hydroxide ions. The anion exchange layer may conduct hydroxide ions. The cation exchange layer may conduct protons. An example bipolar membrane is Fumasep FBM™ available from FUMATECH BWT GmbH.

"Membrane electrode assembly" or "MEA" is an assembly comprising an anode and a cathode separated by a BPM. The anode and the cathode may respectively comprise catalysts suitable for promoting oxidation reactions at the anode and reduction reactions at the cathode.

"Flow cell" refers to an electrochemical cell in which a catholyte and/or anolyte are flowed through the cell while the cell is in operation. A non-limiting example construction of a flow cell provides flow plates separated by an MEA. An anode flow plate is located at the anode side of the MEA and a cathode flow plate is located at the cathode side of the MEA. The anode and cathode flow plates comprise flow channels that respectively receive an anode feed and a cathode feed. A power supply is connected across the anode and cathode of the MEA in the flow cell to drive oxidation reactions at the anode and reduction reactions at the cathode.

"Current density" is total current divided by the geometric surface area of an electrode. For example, an electrode having an area of 100 cm² carrying an electrical current of 20 Amperes would have a current density of 200 mA/cm².

"Faradaic efficiency" (F.E.) is a measure of the efficiency with which an electron transfer reaction generates a desired product. Faradaic efficiency can be reduced by side reactions which create undesired products or by further reactions which consume the desired product after it is produced. F.E. for a gaseous product k may be determined in accordance with Equation 1.

$$FE = \frac{n_k F_{x_k} F_m}{I} \quad \text{(Eq. 1)}$$

where $n_k$ is the number of electrons exchanged, F is Faraday's constant (F=96,485 C/mol), $x_k$ is the mole fraction of the gas k in the gaseous mixture analyzed, $F_m$ is the molar flow rate in mol/s, and I is the total current in A. The molar flow rate may be derived from the volume flow rate $F_v$ by the relation $F_m = pF_v/RT$, with p being the atmospheric pressure in Pa, R the ideal gas constant of 8.314 J/mol K and T the temperature in Kelvin.

Example Embodiments

FIG. 1 is a block diagram showing carbon capture apparatus 10 according to an example embodiment. Flue gas 12 or another gas containing $CO_2$ to be captured (e.g. air, exhaust gas etc.) is carried in a duct 13 to a contactor 14. In contactor 14 $CO_2$ is contacted with a circulating solution with which it reacts to form carbonate and/or bicarbonate ions in the circulating solution. The circulating solution may be an alkaline solution. The circulating solution may, for example, comprise an aqueous solution of a strong base such as NaOH or KOH. Gases 12A output from contactor 14 have reduced carbon dioxide content.

The circulating solution is carried by an outlet line 15 to a flow through electrochemical reactor 16. At electrochemical reactor 16 the carbonate and/or bicarbonate ions undergo electrochemical reactions which yield useful chemicals.

The electrochemical reactions are facilitated by electrical power supplied to electrochemical reactor 16. The electrical power may, for example, come from a source of green energy such as a solar array 11, wind energy or the like. In some embodiments flue gas 12 is emitted from an electrical power generator and electrical power for electrochemical reactor 16 is provided from the power generator.

The useful chemicals are separated from the circulating solution at a separator 17 and are taken off at outlet 18. In some embodiments the useful chemicals are in the gas phase and separator 17 is a gas/liquid separator. The useful chemicals may, for example comprise one or more of: carbon dioxide and carbon monoxide. Electrochemical reactor 16 may also produce hydrogen gas. In some embodiments the useful chemicals include syngas.

The circulating solution is circulated back to contactor 14 by conduit 19. One or more pumps (not shown in FIG. 1) are provided to drive circulation of the circulating solution. Other design details of apparatus 10 such as fluid storage vessels, sources of chemicals to maintain the circulating solution at a desired pH and/or to maintain desired concentrations of chemical species in the circulating solution, sensors for monitoring operation etc. may optionally be present in apparatus 10 but are omitted from FIG. 1 for clarity.

Electrochemical reactor 16 of apparatus 10 may advantageously be operated at relatively low temperatures (e.g. temperatures below the boiling point of the circulating solution used). Electrochemical reactor 16 may, for example operate at ambient temperature and/or at a temperature of 150 QC or lower.

Electrochemical reactor 16 of apparatus 10 may advantageously be operated at or near to ambient pressure.

Figure 1A:
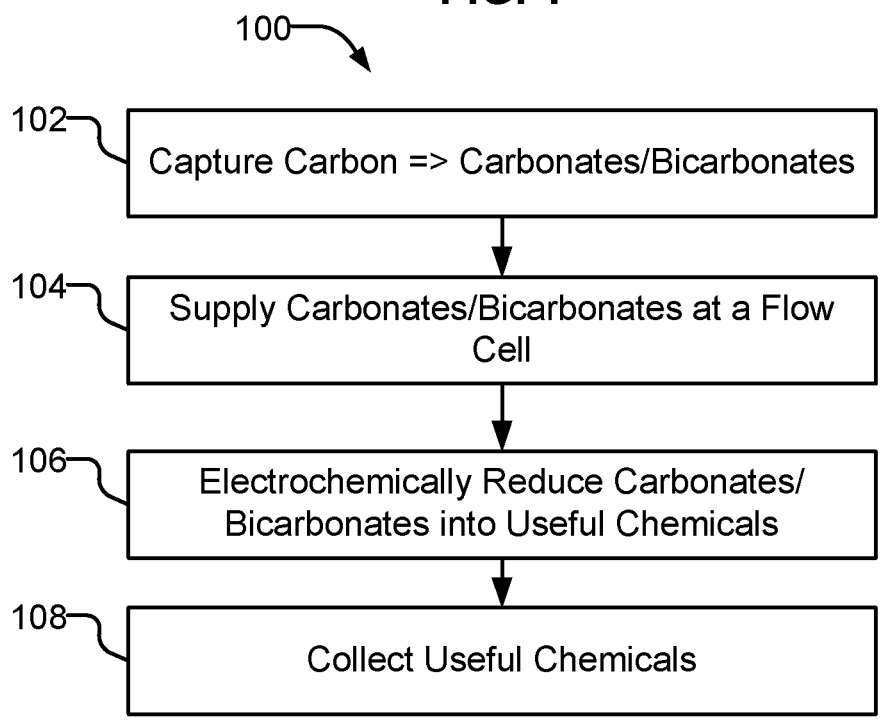
FIG. 1A is a flow chart depicting a method for capturing carbon (in the form of $CO_2$) and using the captured carbon to provide useful products according to an example embodiment of the invention.

FIG. 1A is a flow chart depicting an example carbon capture method 100. Method 100 takes in carbon dioxide from a gaseous source (e.g. air, flue gas, exhaust gas) and yields useful carbon-containing chemicals. In block 102, $CO_2$ is captured through a chemical process that yields carbonates ($CO_3^{2-}$) and/or bicarbonates ($HCO_3^-$) in an aqueous solution.

In some embodiments, the chemical process involves flowing ambient air or another gas containing carbon dioxide through a filter (e.g. contactor 14) comprising a liquid solvent sorbent. The sorbent removes $CO_2$ from the carbon dioxide containing gas by absorbing the $CO_2$. Examples of sorbents include but are not limited to caustic alkaline solutions (e.g. NaOH or KOH). $CO_2$ can undergo an acid-base reaction with a caustic solution to yield a stable carbonate (e.g. sodium carbonate) or bicarbonate as reaction products. In an example case, $CO_2$ molecules become dissolved in the aqueous solution where they react to form anions such as bicarbonate anions.

The aqueous solution may, for example, have a pH in excess of 8. In some embodiments the solution has a pH in the range of 8-10. After absorbing $CO_2$ the solution contains ions of carbonate or bicarbonate. For example, the aqueous solution may have a $[HCO_3^-]$ or $[CO_3^{2-}]$ of 0.5M or higher. In some embodiments at the output of block 102 the concentration of carbonate or bicarbonate ions in the aqueous solution is in the range of about 0.5M to about 3.3M or higher. The aqueous solution may contain alkali metal ions (e.g. $K^+$, $Na^+$) as counter cations.

Enzyme catalysts are optionally provided. Such catalysts may be selected to be catalysts that increase the efficiency of $CO_2$ absorption. Example enzyme catalysts suitable for promoting carbon capture include, but are not limited to, carbonic anhydrases. These enzymes can advantageously withstand high temperatures (i.e. >100° C.) and extreme alkalinity (i.e. pH>10). Suitable enzymes can be native, engineered and/or artificially produced.

In some embodiments, amine based solvents are used in place of caustic solutions in block 102 to absorb $CO_2$ from a carbon dioxide containing gas. Example amines that are suitable for use in association with gas treatment include, but are not limited to: aqueous alkanolamine (e.g. tri-ethyl amine), diethanolamine (DEA), monoethanolamine (MEA), Methyldiethanolamine (MDEA), Diisopropanolamine (DIPA) and Aminoethoxyethanol (Diglycolamine) (DGA).

In block 104, the solution containing the dissolved carbonates and/or bicarbonates is supplied as catholyte at the cathode side of an electrochemical flow cell. The dissolved carbonates and/or bicarbonates are advantageously supplied in some embodiments in the absence of a gaseous $CO_2$ feed.

A suitable anolyte is supplied at the anode side of the flow cell. In some embodiments the anolyte is basic. Examples of suitable anolytes include, but are not limited to, potassium hydroxide (KOH) and sodium hydroxide (NaOH). In other embodiments the anolyte may be acidic.

In block 106, an electrical potential is applied between the anode and cathode of the flow cell to electrochemically reduce the aqueous carbonates and/or bicarbonates into useful chemicals (e.g. $CO_2$, $H_2$, CO, etc.). In block 108, the useful chemicals are collected, stored and/or otherwise transported for further processing.

Directly supplying solutions containing bicarbonate ($HCO_3^{2-}$) and/or carbonate ($CO_3^{2-}$) produced by carbon capture 102 to an electrochemical reactor as illustrated, for example, in FIGS. 1 and 1A has the advantage that the concentrations of these species in saturated aqueous solutions can be quite high (e.g. up to about 3.3 M for $KHCO_3$ and about 8.1 M for $K_2CO_3$). This helps to facilitate high current densities in the electrochemical reactor. The direct electrochemical reduction of a $HCO_3^-$ or $CO_3^{2-}$ solution advantageously avoids acidification of the electrolyte. In contrast, $CO_2$ has a relatively low solubility in aqueous solutions and dissolution of $CO_2$ in water reduces pH.

Figure 2:
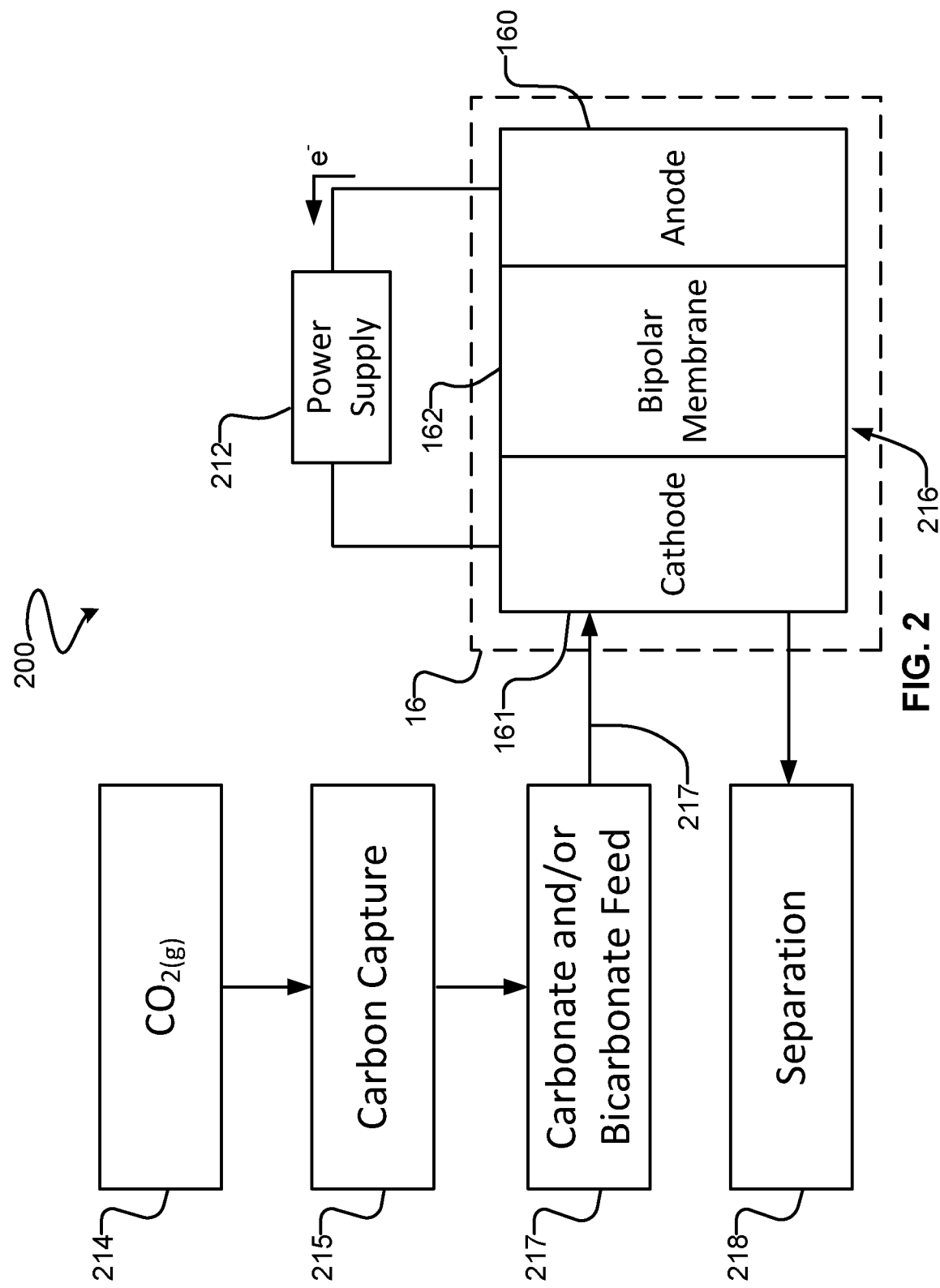
FIG. 2 is a block diagram of a system for converting carbon dioxide emissions to useful materials according to an example embodiment of the invention.

FIG. 2 is a block diagram illustrating a carbon capture system 200 according to an example embodiment. System 200 comprises an electrochemical reactor 16 comprising at least one cell 216. Electrochemical cell 216 comprises an anode 160 and a cathode 161 separated by a BPM 162. Cathode 161 may be a gas diffusion electrode.

An electrical potential is applied between cathode 161 and anode 160 from a power supply 212. Power supply 212 may be configured to maintain a desired electrical potential difference between cathode 161 and anode 160. Electrical power may be supplied to power supply 212 from any suitable source including solar cells, mains electricity or the like.

An aqueous feed 217 comprising $CO_3^{2-}$ and/or $HCO_3^-$ is supplied from a carbon capture process 215 to cathode 161.

Cathode 161 comprises one or more catalyst materials 161A (see FIG. 3) that promote electrochemical reduction reactions which yield CO or another desired product.

Feed 217 now carrying the desired product is carried to a separation stage 218 where the product is taken off or used. In embodiments where the product(s) are gaseous the separation stage may comprise a gas liquid separator. In a simple embodiment the gas liquid separator may comprise a closed compartment having an upper section in which gases may be collected. In other cases separation stage 218 may comprise a selective membrane or other technology for separating the desired products from the flow of feed 217 exiting reactor 16.

It is generally desirable to collect product gases as soon as practical. Produced $CO_2$ can revert to bicarbonate if it is not collected and taken out of the catholyte. For this reason it can be desirable to provide separation stage 218 at the outlet of a cell 216 and/or to provide volumes in which gaseous products can be collected and withdrawn from one or more locations inside cell 216.

A system 200 as illustrated in FIG. 2 may, for example be operated to generate CO directly from $CO_3^{2-}$ and/or $HCO_3^-$ produced from carbon capture process 215 without first extracting $CO_2$ from feed 217.

Reactor 16 is shown in FIG. 2 as a single cell 216 for ease of illustration. However, in practical implementations reactor 16 may comprise multiple cells which may have fluid connections in parallel, in series or in series-parallel as known in the art. Such cells may have separate power supplies or groups of cells may share a power supply. Where a single power supply provides electrical power to drive plural cells, the plural cells may be electrically connected to the power supply in series, in parallel or in series-parallel.

In some embodiments, heat derived from the operation of reactor 16 may be used in other parts of a production plant.

A reactor 16 can be optionally scaled to include multiple cells 216 each connected to receive $CO_3^{2-}$ and/or $HCO_3^-$ from feed 217. Cells 216 may, for example, be arranged in stacks. Stacks of cells 216 can be connected in parallel such that a single aqueous stream is split to simultaneously feed multiple cells 216, in series where each subsequent cell receives a feed containing reduced concentrations of $CO_3^{2-}$ and/or $HCO_3^-$ or in a configuration comprising a combination of parallel and series connections.

Figure 2A:
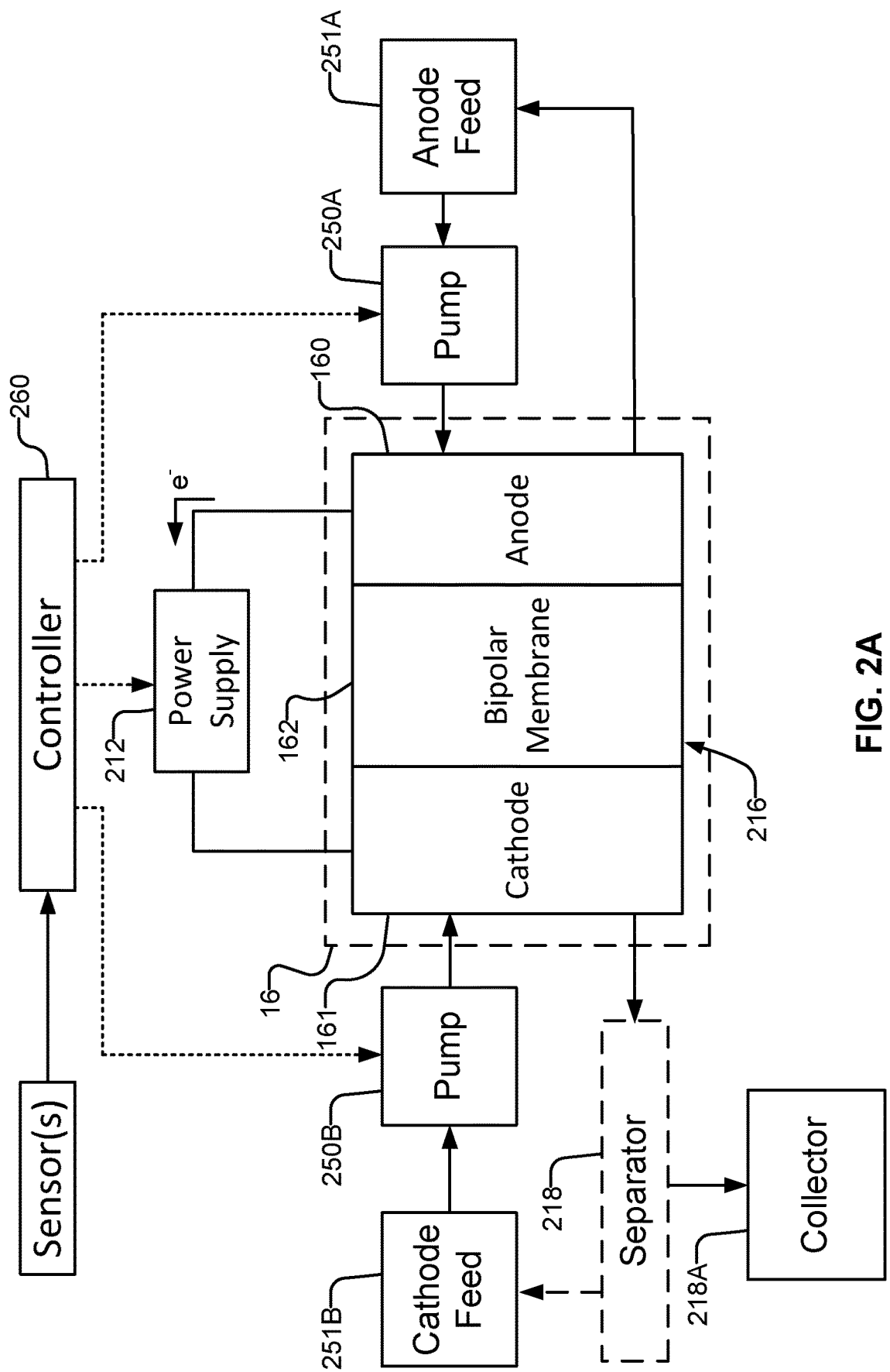
FIG. 2A is a block diagram illustrating a bipolar membrane-based $CO_3^{2-}/HCO_3^-$ electrochemical reactor including ancillary equipment according to an example embodiment.

An electrochemical reactor 16 may include various ancillary systems. FIG. 2A is a block diagram illustrating an electrochemical reactor 16 which includes pumps 250A and 250B which are respectively connected to deliver flows of anode feed 251A and cathode feed 251B to anode 160 and cathode 161 respectively. In some embodiments an output stream from cathode 161 is processed by one or more filters/separators 218. Filters/separators 218 may operate to deliver desired products (e.g. CO) to collector 218A and/or recirculate the output stream from cathode 161 back to cathode feed 251B and/or back to a carbon capture process (not shown in FIG. 2A). Anode Feed 251A may similarly be recirculated through pump 250A.

In some embodiments, collector 218A comprises additional chemical processing stages operative to convert the collected gases to other chemicals. For example, collector 218A may provide processing stages for converting collected syngas to:

methanol and/or its derivatives (e.g. formaldehyde, acetic acid, methyl tert-butyl ether, dimethyl ether) via a methanol synthesis process, synthetic diesel fuel via Fischer-Tropsch and/or ethylene and other $C_{2+}$ products using an electrochemical reactor that uses gaseous CO and/or $CO_2$ as feedstock.

FIG. 2A also shows a controller 260. Controller 260 controls one or more of:

power supply 212, pumps 250A and/or 250B, a valve or other device that is operative to control how much of anode feed 251A is recycled, etc.

based on manually inputs and/or inputs from sensor(s) 261.

Sensor(s) 261 may monitor one or more or any combination of:

cell temperature, current supplied by power supply 212, voltage supplied by power supply 212, composition, pressure and/or temperature of anode feed 251A and/or cathode feed 251B entering cell 216, composition of cathode feed 251B leaving cell 216, etc.

Some non-limiting examples of functions that may be performed by controller 260 include:

regulating voltage and/or current being supplied by power supply 212 to maintain a desired balance of carbon monoxide to hydrogen in cathode feed 251B leaving cell 216, decreasing a voltage and/or current being supplied by power supply 212 in response to detecting more than a desired amount of side-reaction products, etc.

In some embodiments controller 260 comprises a suitably-programmed commercially available process controller. In general, controller 260 may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a controller for a cell 216 or system of cells 216 may implement methods as described herein by executing software instructions in a program memory accessible to the processors.

Figure 3:
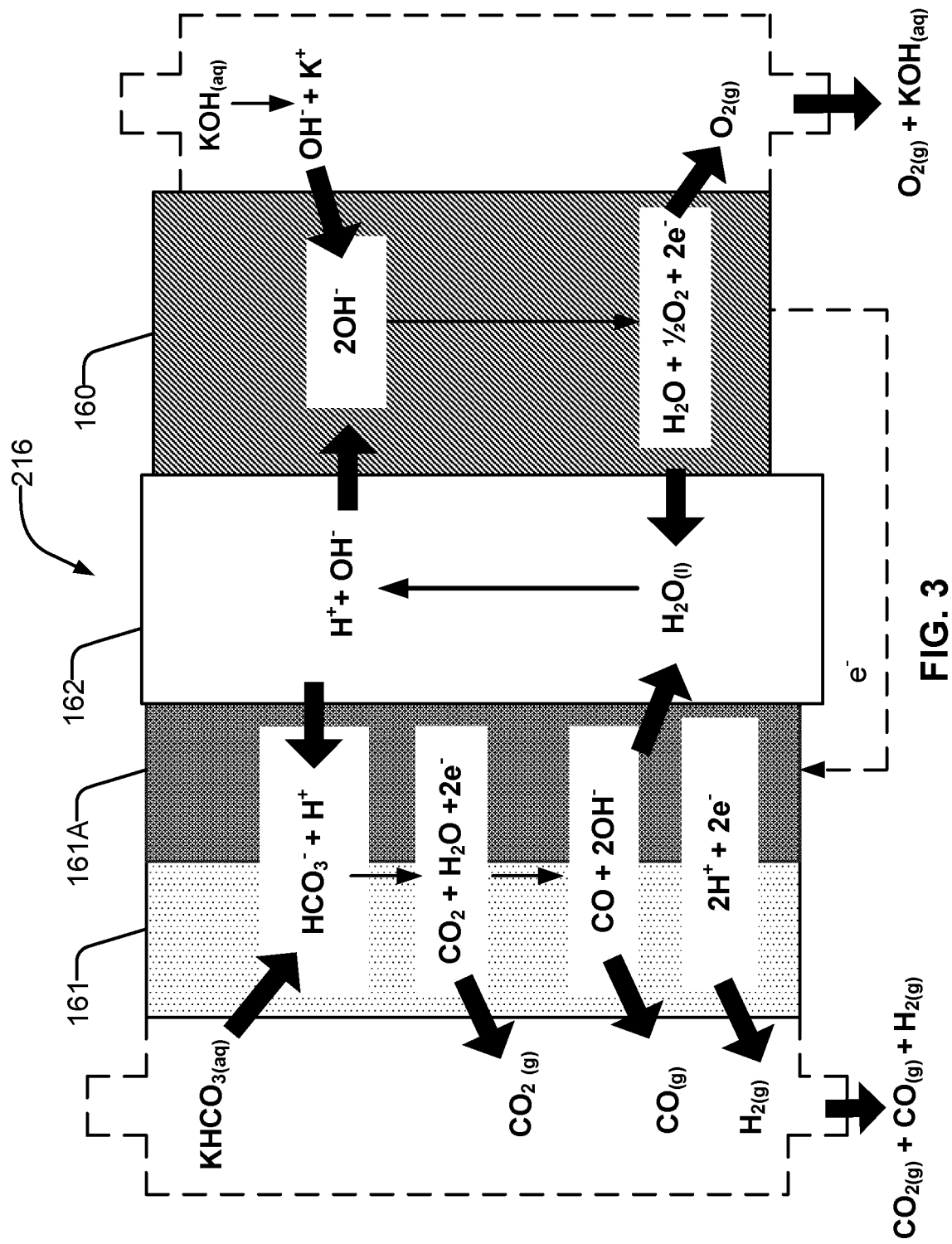
FIG. 3 is a schematic diagram indicating electrochemical reactions that occur within a bipolar membrane-based $CO_3^{2-}/HCO_3^-$ electrolyzer cell according to an example embodiment.

FIG. 3 is a schematic diagram depicting some of the electrochemical reactions that are believed to occur in a cell 216 of an electrochemical reactor 16 according to an example embodiment. Application of electrical potential between anode 160 and cathode 161 causes electrolysis of water at BPM 162. Protons ($H^+$) travel toward cathode 161. The protons react with dissolved $HCO_3^-$ or $CO_3^{2-}$ in the catholyte to yield $CO_2$. This acid/base equilibrium reaction between $HCO_3^-/CO_3^{2-}$ and $H^+$ at or near the surface of BPM 162 may occur in accordance with Equations 2 and 3 below.

$$H^+ + CO_3^{2-} \rightleftharpoons HCO_3^- \quad (Eq.\ 2)$$

$$H^+ + HCO_3^- \rightleftharpoons CO_2 + H_2O \quad (Eq.\ 3)$$

At least some of the resulting $CO_2$ undergoes catalyzed electrochemical reactions at cathode 161 to yield CO. These $CO_2$ reduction reactions may occur in accordance with Equations 4-6 below.

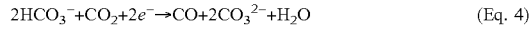
$$2HCO_3^- + CO_2 + 2e^- \rightarrow CO + 2CO_3^{2-} + H_2O \quad (Eq.\ 4)$$

$$2H^+ + CO_2 + 2e^- \rightarrow CO + H_2O \quad (Eq.\ 5)$$

$$H_2O + CO_2 + 2e^- \rightarrow CO + 2OH^- \quad (Eq.\ 6)$$

Protons and/or water may be reduced at cathode 161 in accordance with equations 7 and 8 to yield $H_2$.

$$2H_2O + 2e^- \rightarrow H_2 + 2OH^- \quad (Eq.\ 7)$$

$$2H^+ + 2e^- \rightarrow H_2 \quad (Eq.\ 8)$$

In the FIG. 3 example embodiment, the reduction reactions that occur at cathode 161 (e.g. as described in Equations 4, 6 and 7) generate reaction products that increase pH (increase alkalinity) of the catholyte. For example, these reactions may yield a weak base (e.g. $CO_3^{2-}$) or a strong base (e.g. $OH^-$). The generation of these bases increases the alkalinity of the catholyte solution. Increasing the alkalinity of the catholyte solution advantageously increases $CO_2$ solubility in $HCO_3^-/CO_3^{2-}$ solutions. This may be beneficial when recycling the catholyte solution to absorb more ambient $CO_2$ in the carbon capture process. In effect, the electrochemical processing of the catholyte solution to convert carbonate ions and bicarbonate ions can have the advantageous side effect of regenerating the catholyte solution for reuse in carbon capture.

The proportion of produced $CO_2$ that is converted to CO depends on factors including:
the physical structure of cell 216 (e.g. the path length for $CO_2$ to reach catalytic sites on cathode 161, the surface area and distribution of catalytic sites of cathode 161),
the nature of the cathode catalyst (e.g. the activity of the cathode catalyst, the selectivity of the cathode catalyst for promoting reaction of $CO_2$ to CO),
the characteristics of a cathode gas diffusion layer (GDL) (a more hydrophobic GDL tends to reduce production of CO, possibly because a hydrophobic GDL makes it more likely that $CO_2$ will be pulled into the GDL before it reacts to form CO. A thinner GDL tends to increase CO production. A thin and/or non-hydrophobic GDL can select for higher CO production while a thicker and/or more hydrophobic GDL can select for higher $CO_2$ production),
the applied electrical potential, and the characteristics of the catholyte (e.g. concentrations of dissolved species, pH).

The ratio of CO to $CO_2$ produced by cell 216 may be varied by altering one or more of these parameters.

It is desirable that cathode 161 and in particular the gas diffusion layer and catalyst of cathode 161 are located close to BPM 162. In some embodiments cathode 161 is in contact with BPM 162. In some embodiments cathode 161 is spaced apart from BPM 162 by a distance of 100 µm or less.

Figure 3A:
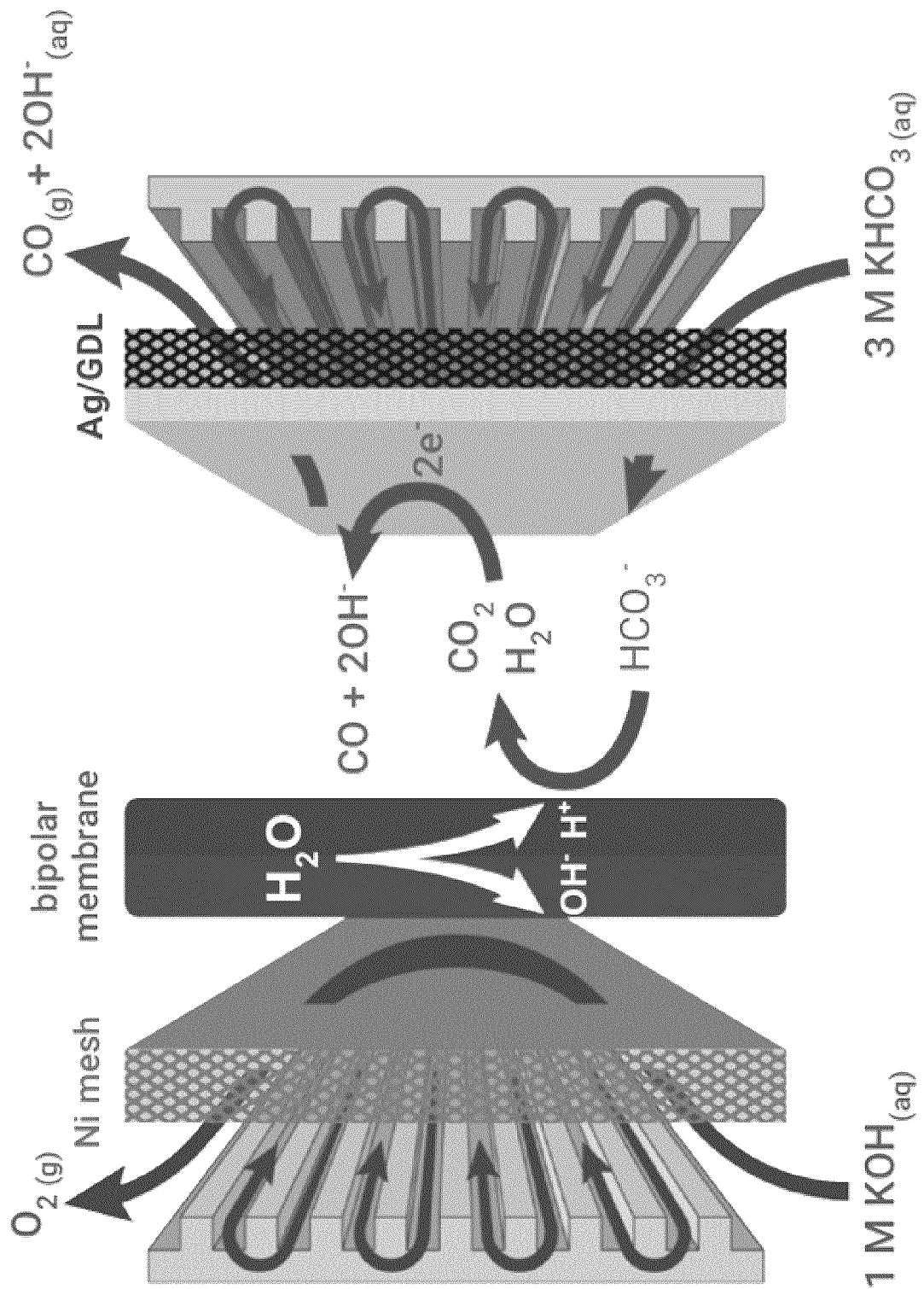
FIG. 3A is a schematic diagram indicating electrochemical reactions for production of CO in a flow cell where the catholyte comprises 3M $KHCO_3$ and the anolyte comprises 1M KOH.

FIG. 3A illustrates electrochemical reactions for production of CO in a flow cell where the catholyte comprises 3M $KHCO_3$ and the anolyte comprises 1M KOH.

Figure 3B:
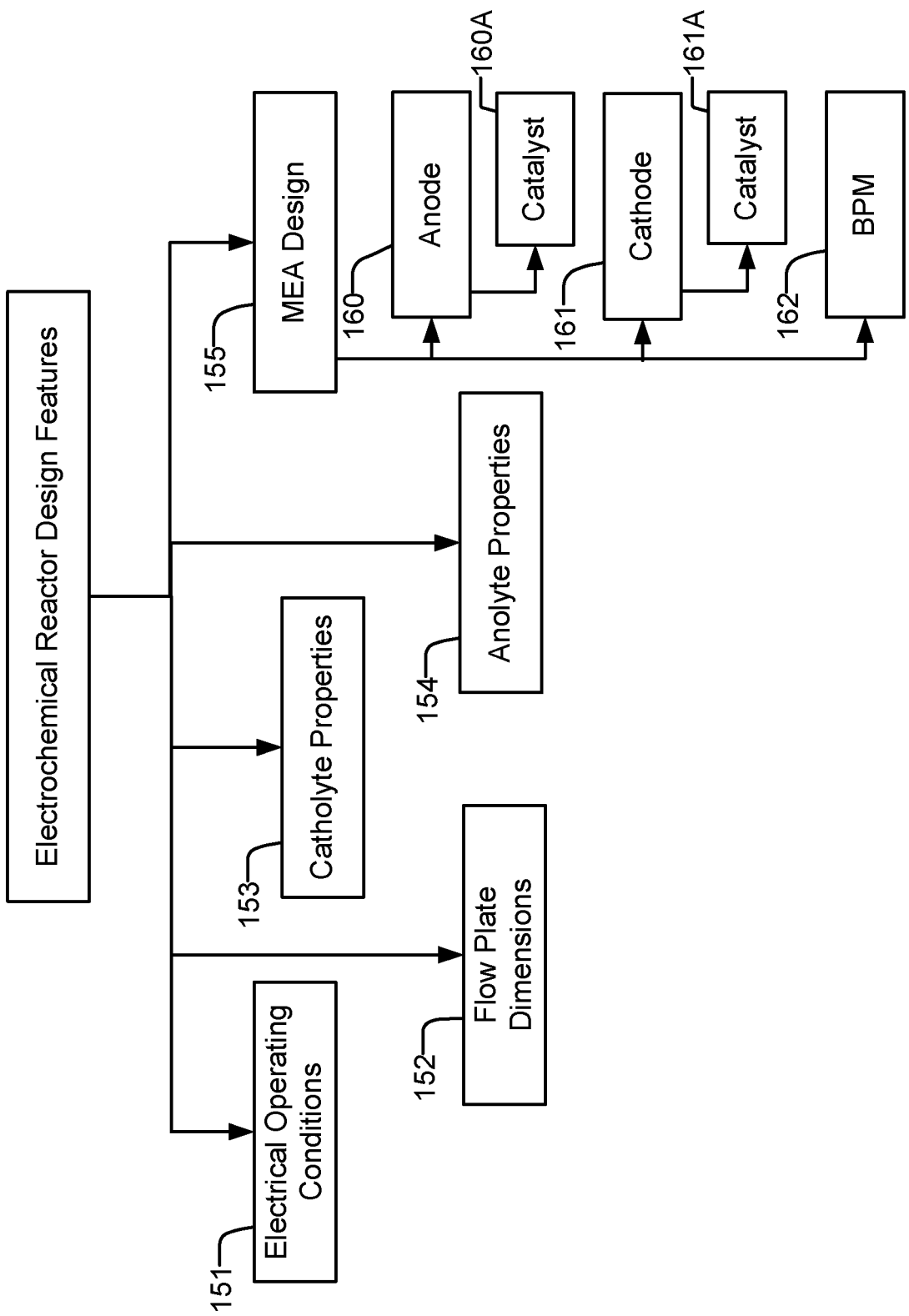
FIG. 3B is an organizational chart showing characteristics of a flow cell that may be selected to accomplish desired results and/or to control composition of a product gas.

FIG. 3B is an organizational chart depicting characteristics of an electrochemical reactor 16 that may be adjusted to tune the operation of the electrochemical reactor. These characteristics include but are not limited to: electrical operating conditions 151, flow plate dimensions 152, and MEA Design 153.

Examples of electrical operating conditions 151 include but are not limited to a potential applied between anode and cathode, the magnitude of current driven between the anode and cathode and any time variation of the potential and/or current.

Adjusting electrical operating conditions 151 can alter the ratios of product chemicals yielded by electrochemical reactions (e.g. $CO_2$, $H_2$, CO, etc.). For example, the applied current or potential can be increased to generate more $CO_2$ and $H_2$. This will cause CO production to decrease, since the total molar amount of reduced products (e.g. $H_2$ and CO) is proportional to the total current supplied (in accordance with Faraday's Law).

In some embodiments, electrical operating conditions 151 are tuned to reduce $HCO_3^-$ and/or $CO_3^{2-}$ and to yield $CO_2$:CO:$H_2$ at a molar ratio of about 2:1:1.

In some embodiments, electrical operating conditions 151 is tuned in synchrony with other flow cell specifications to reduce $HCO_3^-$ and/or $CO_3^{2-}$ to yield $CO_2$:CO:$H_2$ at molar ratios ranging from 4:3:1 to 5:1:4. Example flow cell specifications that can be adjusted include, but are not limited to, gas diffusion electrode properties such as ionomer content, Ag catalyst loading, PTFE content, GDL porosity, GDL thickness, etc.

Examples of flow plate characteristics 152 include but are not limited to: flow plate surface area, flow plate channel width, and flow field patterns within the flow plate. A flow plate may have channels that provide a serpentine flow field, a flow field comprising parallel channels, a flow field comprising an interdigitated pattern, etc. The anode flow plate and the cathode flow plate may have the same or different flow plate configurations 152.

At higher current densities, an interdigitated pattern may desirably provide improved Faradaic efficiency. With an interdigitated pattern an input to the flow field connects to a first set of channels and an output from the flow field connects to a second set of channels. The first and second sets of channels are interdigitated. Catholyte (or anolyte) can flow from a channel of the first set of channels to a channel of the second set of channels through a porous part of the cathode (or anode).

Examples of catholyte properties 153 include but are not limited to: pH, concentration of bicarbonate and/or carbonate, other species present, solvent etc. Some embodiments prefer catholyte concentrations in the range between 1.5 M to 3.0 M $HCO_3^-$. Some embodiments prefer catholyte pH in the range of 8-10.

Examples of anolyte properties 154 include but are not limited to: pH, species present, solvent etc. Appropriate selection of anolyte can reduce the electrical potential required across a cell 216 and therefore increase energy efficiency. For example, operating the anode under acidic conditions may facilitate reduced potential if the membrane being used is a cation exchange membrane opposed to a bipolar membrane, especially when the anode catalyst is selected to promote the oxygen evolution reaction under acidic conditions. Some embodiments prefer a KOH anolyte solution having concentrations in the range between 1 M to 5 M KOH. Such solutions are not too caustic and may advantageously avoid corroding the electrolyzer cell.

Examples of MEA design characteristics 155 include but are not limited to selecting materials and physical characteristics for anode 160, cathode 161 and BPM 162.

In some embodiments anode 160 is porous. For example, anode 160 may comprise a layer of a porous foam of a suitable metal (e.g. nickel). Anode 14 may additionally comprise an anode catalyst 160A suitable for promoting oxidation reactions. In a preferred embodiment, anode 160 operates under basic conditions (i.e. pH in the range of 7 to 14). In basic conditions, efficient and earth-abundant transition metal catalysts may be used as the anode catalyst. Examples of suitable anode catalysts in the case where the anode is operated under basic conditions are Ni, and $FeNiO_x$. Precious metals such as Pt or Ir may also be used as anode catalysts. In an example embodiment, anode 160 comprises a layer of a porous metal (e.g. a porous nickel foam) that acts as a catalyst for an anode-side electrochemical reaction and is formed to provide a diffusion layer.

In some embodiments cathode 161 comprises a gas diffusion layer. The gas diffusion layer may comprise porous materials such as carbon felt, carbon paper, carbon cloth, a sintered gas diffusion layer, or the like. Cathode 161 additionally includes a cathode catalyst 161B suitable for promoting the reduction of carbonates and/or bicarbonates to CO or other desired products.

An example of a suitable cathode catalyst is silver (Ag). Silver catalysts tend to promote reactions which yield CO. It is possible to produce $CO_2$:CO:$H_2$ at a 1:0:1 ratio by using a cathode catalyst that does not promote reactions that yield CO. Another example cathode catalyst is gold (Au). Other examples for cathode catalyst 161B are any late first (or second) row transition metal catalyst, post-transition metals (e.g. bismuth), alloys of suitable metals, suitable metal oxides, mixtures of silver and gold, etc. Some embodiments use bi and tri-metal mixed metal materials as cathode catalyst 161B. A highly active cathode catalyst 161B may be chosen to promote the electrochemical production of desired products when carbonates and/or bicarbonates are supplied to the electrochemical reactor.

Cathode catalyst 161B may, for example, be provided in the form of an electrocatalyst ink. The electrocatalyst ink may optionally comprise a dispersion of silver nanoparticles, a conductive ionomer, PTFE to control water content, etc.

BPM 162 may comprise materials that have properties including, but not limited to: high proton conductivity by the cation exchange layer, high hydroxide conductivity by the anion exchange layer high resistance to electrons, impermeability to carbon products, long-term chemical stability, long-term thermal stability and/or high mechanical robustness. Bipolar membranes suitable for use as BPM 162 are commercially available from companies such as FUMATECH BWT GmbH of Germany.

In some embodiments, the temperature of cells of an electrochemical reactor are adjusted. Increasing temperature may advantageously encourage the conversion of $HCO_3^-$ and/or $CO_3^{2-}$ to $CO_2$ within the flow cell. In some embodiments a temperature of the cathode in an electrochemical reactor as described herein is maintained to be in the range of about 40° C. to 70° C. In some embodiments the cells of an electrochemical reactor are operated at ambient temperature (e.g. room temperature) as raised due to the effect of heating arising from the operation of the cells of the electrochemical reactor.

The apparatus and methods described herein may be varied. For example:
electrochemical cells as described herein may be applied to process bicarbonate and/or carbonate from sources other than carbon capture (e.g. converting $HCO_3^-$ found in seawater into CO and $H_2$);
a bipolar membrane may be provided by combining a cation exchange membrane and an anion exchange membrane.
a cation exchange membrane ("CEM") may be used in place of a bipolar membrane with suitable adjustments made to other electrochemical reactor design features, such as providing an acidic anolyte (e.g. $H_2SO_4$, HCl, $H_3PO_4$). The acidic anolyte may, for example, have a concentration in the range of about 0.1 M to 10 M. Where an acidic anolyte is used it can be desirable to use an acid-stable anode catalyst (e.g. Ir, Ru, Cr or Pt) or its oxide derivate on an acid stable conductive support (e.g. Pt, Ti). Protons from the anode side may pass through a CEM to the cathode side;
an anion exchange membrane ("AEM") may be used in place of a bipolar membrane with suitable adjustments made to other electrochemical reactor design features to yield reactions at the AEM and catalyst according to Equations 9 and 10 respectively

(Eq. 9)

(Eq. 10)

alternative cathode catalysts may be used (alone or with one or more other catalysts as described herein) to yield products other than or in addition to carbon dioxide, carbon monoxide and hydrogen.

Prototype Embodiment

Figure 4A:
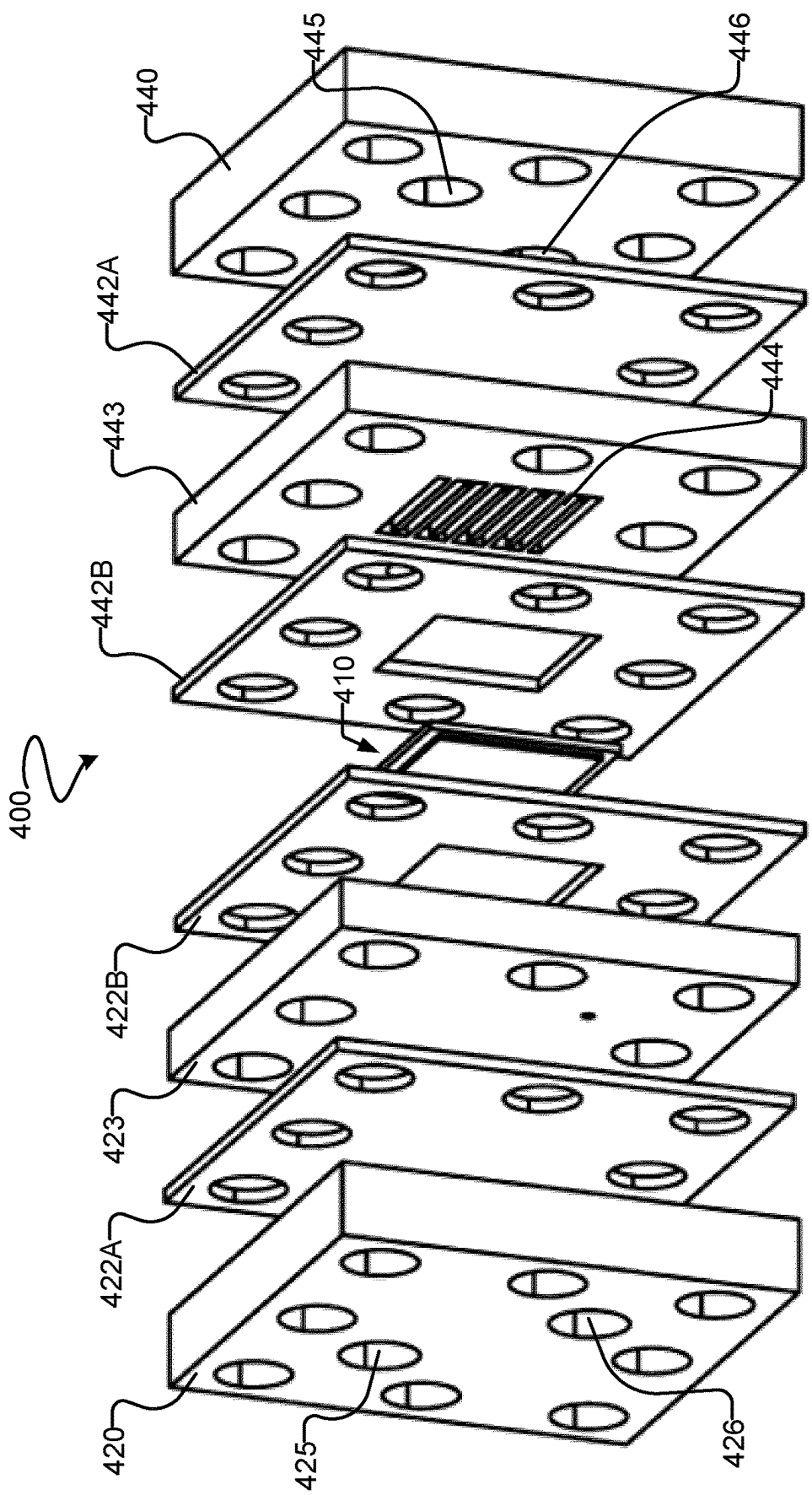
FIG. 4A is an exploded perspective view of an example prototype bipolar membrane-based $CO_3^{2-}/HCO_3$ electrolyzer cell.
Figure 4B:
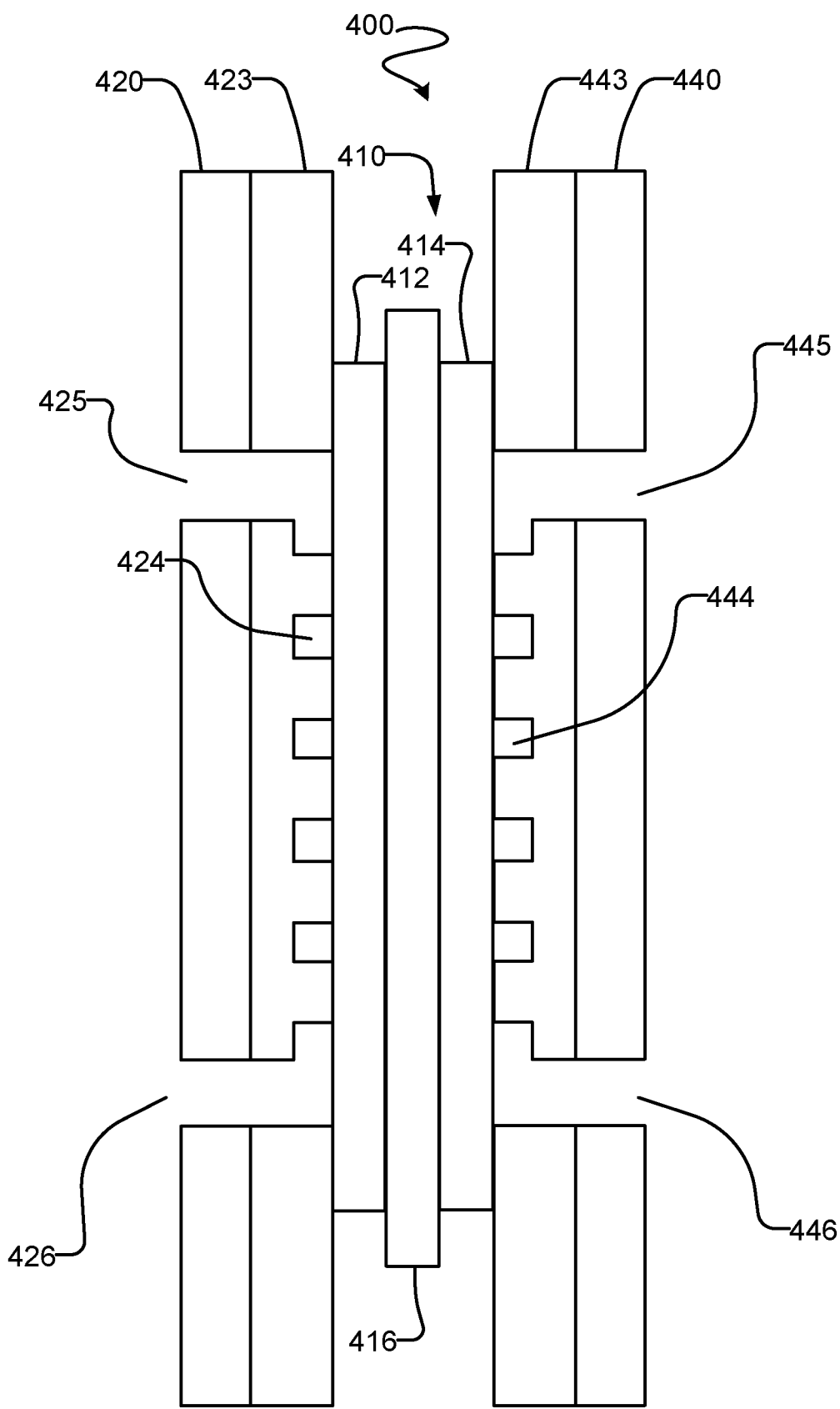
FIG. 4B is a schematic diagram depicting a cross-section of the example prototype bipolar membrane-based $CO_3^{2-}/HCO_3$ electrolyzer cell shown in FIG. 4A.

FIG. 4A is an exploded view of a prototype membrane-based $CO_3^{2-}$/$HCO_3^-$ electrolyzer cell 400 that has been made and used to verify the operation of cells as described herein. FIG. 4B is a schematic diagram depicting a cross-section of cell 400. Cell 400 comprises membrane electrode assembly (MEA) 410. MEA 410 comprises cathode 412, anode 414 and a membrane 416. In the prototype each of cathode 412 and anode 414 had dimensions of 2.5 cm×2.5 cm of which a 2 cm×2 cm area was exposed for an active area of 4 $cm^2$.

In the prototype embodiment, cathode 412 comprises a silver nanopowder/Nafion™ catalyst mixture deposited on a 2.5×2.5 cm carbon paper gas diffusion layer (GDL). The GDL has a high surface area.

In the prototype embodiment, anode 414 comprises a 2.5×2.5 cm nickel foam layer which acts as both a diffusion layer and as an OER catalyst in basic conditions. The nickel foam was model EQ-BCNF-16m available from MTI Corp of Richmond California USA.

Cathode 412 may be prepared, for example, using an ultrasonic spray coating method, a hand coating method and/or an airbrush method. In the prototype embodiment, cathode 412 comprises a GDL and a cathode catalyst prepared by mixing 32 mg of silver nanopowder (Sigma, trace metal basis, >99%), 800 μL of deionized water, 800 μL of isopropyl alcohol and 60 μl of Nafion 117 solution (Sigma, 5 wt % in a mixture of lower aliphatic alcohols and water). In some embodiments, cathode 412 can be prepared by spray-coating a catalyst ink on a 4-$cm^2$ area of carbon cloth (Fuel Cell Store, GDL-CT) and drying the catalyst ink under a gentle air stream. In some embodiments, a mask (e.g. Kapton™ tape) can be applied to avoid depositing catalysts outside the active area of the GDL of cathode 412.

In the prototype, both bipolar membranes and anion exchange membranes (AEMs) were tested as membrane 416 to verify the operation of cells as described herein. Bipolar membranes were purchased from FuMA-tech and stored in 1M NaCl Solution.

MEA 410 is sandwiched between cathode flowplate 423 and anode flowplate 443. The assembly comprising MEA 410, cathode flowplate 423 and anode flowplate 443 is in turn clamped between cathode housing 420 and anode housing 440. Gaskets 422A, 422B, 442A, and 442B seal cell 400.

Cathode housing 420 includes ports 425, 426 connected to deliver cathode feed to cathode 412 by way of cathode flow field 424 in cathode flowplate 423 and to receive reaction products such as CO formed at the cathode of cell 400. Anode housing 440 includes ports 445, 446 connected to deliver anolyte to anode 414 by way of anode flow field 444 in anode flowplate 443 and to recover product (e.g. oxygen gas) formed at the anode of cell 400.

Cathode housing 420 and/or anode housing 440 may be made from suitable materials such as stainless steel or other materials that are chemically inert to anode and/or cathode feeds. Cathode housing 420 and anode housing 440 can be made from the same or different materials.

Figure 4C:
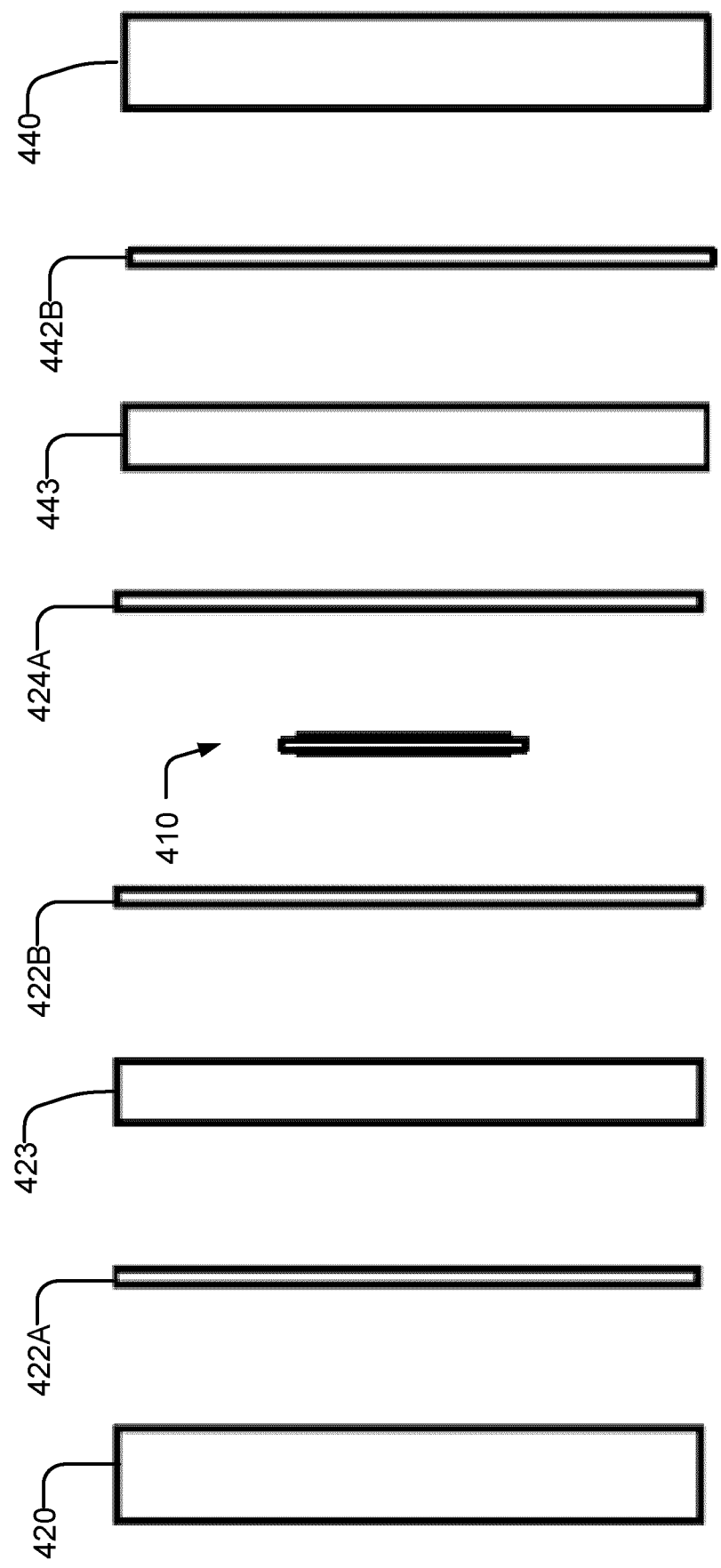
FIG. 4C is an exploded top view of the example prototype bipolar membrane-based $CO_3^{2-}/HCO_3$ electrolyzer cell shown in FIG. 4A.

Flow plates 423 and 443 respectively provide electrical connections between the negative output of a power supply (not shown in FIGS. 4A, 4B, 4C) and cathode 412 and the positive output of the power supply and anode 414. To this end flow plates 423 and 443 are in electrical contact with the electrically conductive diffusion layers of anode 4 and cathode 414 respectively. Flow plates 423 and 443 respectively deliver cathode feed to cathode 412 and anolyte to anode 414 by way of corresponding flow fields 424, 444. In the prototype, flow fields 424, 444 were each made up of serpentine channels 1.5 mm wide and 1.5 mm deep separated by 1-mm ribs.

Cathode flowplate 423 and anode flowplate 443 may be made from the same or different materials. Cathode flowplate 423 may comprise materials that are chemically inert to the cathode reactant (e.g. $CO_3^{2-}$, $HCO_3^-$, etc.), stable in acidic conditions, electrically conductive, and/or unreactive towards the $CO_3^{2-}$/$HCO_3^-$ reduction reaction.

Anode flowplate 443 may comprise materials that are chemically inert to the anode electrolyte, stable in basic conditions, electrically conductive, and/or unreactive toward the oxygen evolution reaction (OER). In the prototype, cathode flowplate 423 and anode flowplate 443 are made from grade 2 titanium and 316 stainless steel respectively.

Gaskets 422A, 422B, 442A, and 442B may be made from the same or different materials. Gaskets 422A, 422B, 442A, and 442B may comprise materials with good chemical inertness and/or high compressibility to maintain gas-tight and liquid-tight seals between different layers of cell 400. In the prototype embodiment, gaskets 422A, 422B, 442A, and 442B comprise 1.5-mm thick chemical resistant compressible polytetrafluoroethylene (PTFE).

Holes formed in gaskets 422A, 442A facilitate fluid delivery between the ports on housings 420, 440 and flowplates 423, 443. Cut outs in gaskets 422B and 442B (in the prototype 2×2 cm square cutouts) expose active areas of anode 412 and cathode 424 to the corresponding flow fields 424, 444.

Figure 5:
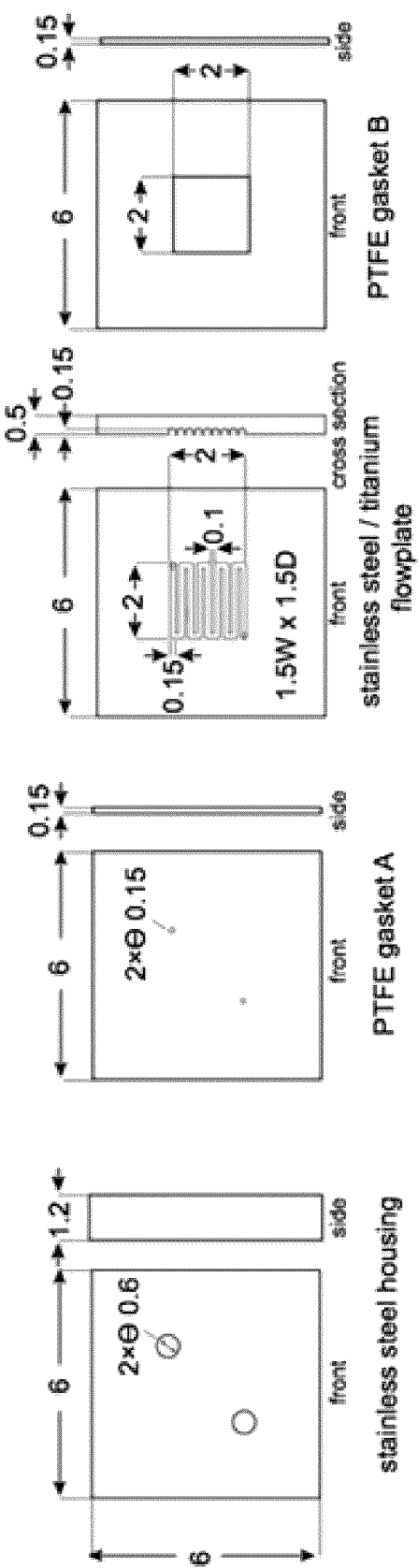
FIG. 5 is a schematic diagram indicating the dimensions of the prototype membrane-based $CO_3^{2-}/HCO_3$ electrolyzer cell shown in FIG. 4A to 4C.

FIG. 5 is a schematic diagram showing dimensions (cm) of components of the prototype cell.

Experimental Electrolysis and Product Analysis.

In experiments using this prototype cell, an aqueous solution of either 3.0 M $K_2CO_3$ or 3.0 M $KHCO_3$ with 0.02 M ethylenediaminetetraacetic acid (EDTA, 99%, Sigma Aldrich) added to remove impurities was purchased from Alfa Aesar and supplied as a cathode feed. The cathode feed was continuously bubbled with either $N_2$ (Praxair, 99.9%) or $CO_2$ gas (Praxair, 99.9%) at 50 sccm and delivered to the cathode through a peristaltic pump at a rate of 50 mL $min^{-1}$.

1 M KOH was recirculated through the anode compartment at a flow rate of 50 mL $min^{-1}$ using a peristaltic pump. Samples of the gaseous headspace of the electrolyzer outlet were vented into the gas-sampling loop of a gas chromatograph (e.g. Perkin Elmer; Clarus 580 GC). Each GC run detected products such as CO and $H_2$.

The GC was equipped with a packed MolSieve 5 Å column and a packed HayeSepD column. Argon (Praxair, 99.999%) was used as the carrier gas. A flame ionization detector with methanizer was used to quantify CO concentration and a thermal conductivity detector was used to quantify hydrogen concentration.

The cathode solution was analyzed by $^1H$ nuclear magnetic resonance (NMR) after electrolysis.

Electrochemical measurements were conducted at room temperature and pressure using a potentiostat (CH instruments 660D with a picoamp booster) through two-electrode cell measurements. Electrochemical measurements were made with a two-electrode system with Ni foam as the anode and Ag spray-coated on carbon paper as the cathode.

Anodes were prepared by cutting as-purchased nickel foam to size. A standard cleaning procedure as described in reference 46 was used to clean both the carbon GDL and nickel foam. The BPMs (FuMA-tech; Fumasep FBM) were stored in 1 M NaCl solution prior to assembly in the cell. A fresh cathode, anode, and BPM were used for each electrolysis test.

Electrolysis of $KHCO_3$ with and without $CO_2$ feed.

Figure 6A:
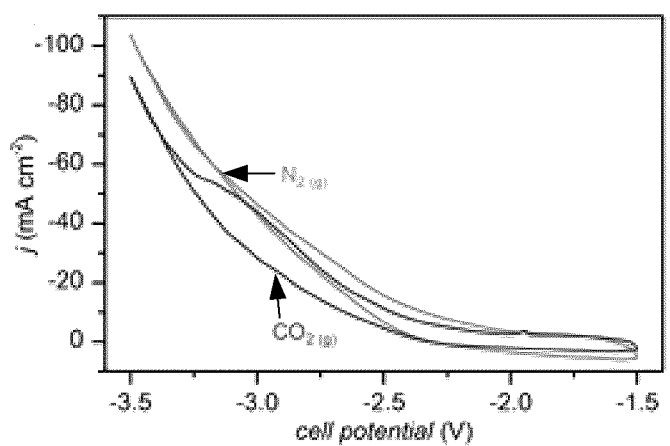
FIG. 6A shows cyclic voltammograms for the example prototype bipolar membrane-based $HCO_3^-$ electrolyzer cell shown in FIGS. 4A to 4C operating with two electrolytic solution cathode feeds.
Figure 6B:
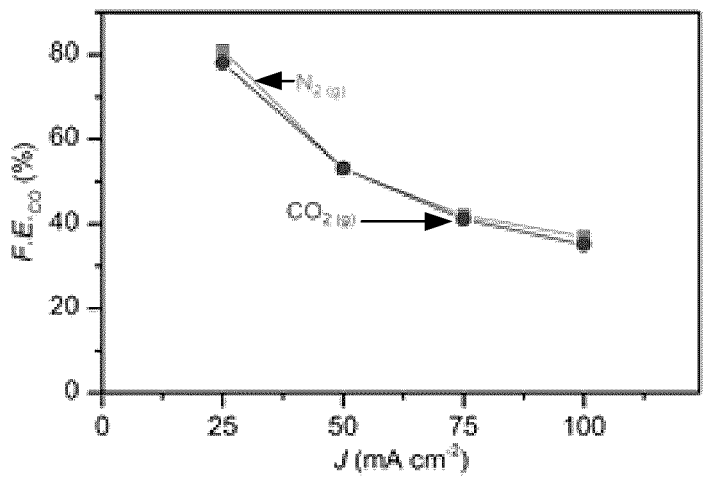
FIG. 6B is a graph showing Faradaic efficiency for CO production at different current densities between 25 to 100 mA cm$^{-2}$ for the electrolytic solution cathode feeds in FIG. 6A using the example prototype bipolar membrane-based $HCO_3^-$ electrolyzer cell shown in FIG. 4.
Figure 6C:
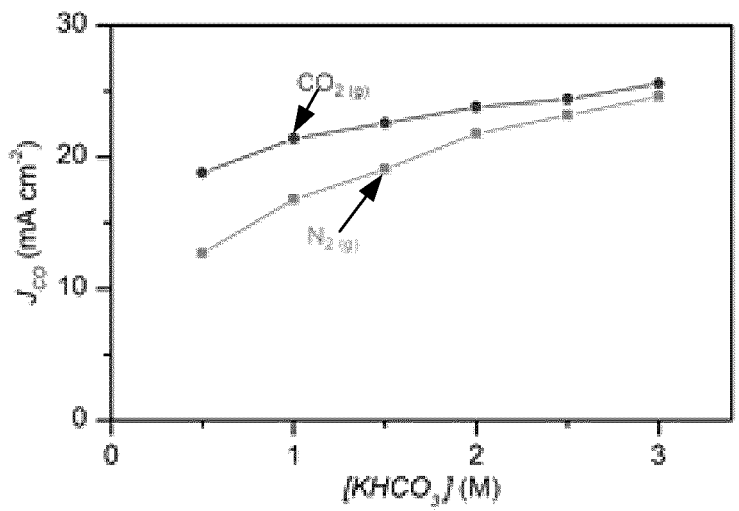
FIG. 6C is a graph showing the dependence of partial current densities for CO measured at a constant cell potential of 3.0 V in a series of $KHCO_3$ solutions prepared with different bicarbonate concentrations saturated with $CO_2$ or $N_2$.

Cyclic voltammograms (CVs) were collected between potentials of −1.5V and −3.5V in the prototype cell for 3.0 M $KHCO_3$ bubbled with $CO_2$ gas, and 3.0 M $KHCO_3$ bubbled with $N_2$ gas (FIG. 6A). Faradaic efficiencies of CO (F.E.$_{CO}$) for the two solutions were measured between current densities of 25 and 100 mA $cm^{-2}$ in 25-mA $cm^{-2}$ increments (FIG. 6B). The viability of the flow cells 216, 400 towards $CO_2$ reduction was confirmed by results from the $CO_2$-saturated 3.0 M $KHCO_3$ solution (see FIG. 6A): The CV exhibits a sharp rise in current density at −2.5 V. A current density of 90 mA cm$^{-2}$ at $-3.5$ V was measured. A moderate F.E.$_{CO}$ of 62% is exhibited at low current densities (20 mA cm$^{-2}$), falling to 21% at higher current densities (100 mA cm$^{-2}$) (see FIG. 6B). The dependence of partial current densities for CO measured at a constant cell potential of 3.0 V in a series of KHCO$_3$ solutions prepared with different bicarbonate concentrations saturated with CO$_2$ or N$_2$ was measured (FIG. 6C)

The electrochemical reduction of bicarbonate and carbonate solutions in prototype flow cell 400 in absence of a CO$_2$ supply was investigated. CVs were collected in the $-1.5$ to $-3.5$ V cell potential range which show similar reductive sweep profiles to the CO$_2$-saturated solution (FIG. 6A). Peak current densities of 100 mA cm$^2$ and 90 mA cm$^{-2}$ were measured for the KHCO$_3$ bubbled with CO$_2$ gas and KHCO$_3$ bubbled with N$_2$ gas solutions respectively. Electrochemical reduction of N$_2$-saturated 3.0 M KHCO$_3$ solution showed a F.E.$_{CO}$ of 80% at a current density of 25 mA cm$^{-2}$, falling to 36% at 100 mA cm$^{-2}$ (FIG. 6B). The F.E.$_{CO}$ is greater (or at least equal) for the N$_2$-saturated 3.0 M KHCO$_3$ solution compared with the analogous CO$_2$-saturated solution at every current density between 25 and 100 mA cm$^{-2}$. This result is believed to be the first observation of KHCO$_3$ reduction to CO in the absence of a gaseous CO$_2$ feed, and the first example of electrochemical reduction of KHCO$_3$ to a reduced carbon product other than formate.

Concentration and pH of Dissolved CO$_2$ after Electrolysis.

The concentrations of dissolved CO$_2$ in each of the three electrolytes were calculated. [CO$_2$] values in bulk solution were resolved using the bicarbonate and carbonate equilibria equations (Eq. 11 and 12, respectively) in conjunction with the pH as measured by a pH meter.

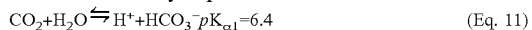
$$CO_2 + H_2O \rightleftharpoons H^+ + HCO_3^- \, pK_{a1} = 6.4 \quad \text{(Eq. 11)}$$

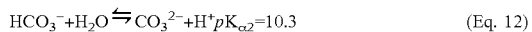
$$HCO_3^- + H_2O \rightleftharpoons CO_3^{2-} + H^+ \, pK_{a2} = 10.3 \quad \text{(Eq. 12)}$$

The pH for CO$_2$-saturated 3.0 M KHCO$_3$ solution was measured to be 8.2 giving a [CO$_2$]=33 mM. This concentration is consistent with the reported value of saturated CO$_2$ aqueous solution. The pH for N$_2$-saturated 3.0 M KHCO$_3$ electrolyte was measured to be 9.0, giving [CO$_2$]=6.6 mM which is significantly lower than [CO$_2$] in the bicarbonate solution bubbled with CO$_2$. The environment at the surface of the electrode may have a higher pH due to the consumption of protons during the electrochemical formation of either H$_2$ or CO, resulting in a lower localized concentration of CO$_2$ compared to the bulk solution.

Despite the 5-fold difference in CO$_2$ concentration between the CO$_2$-saturated and N$_2$-saturated bicarbonate solutions, these two solutions exhibit similar performance for the electrochemical production of CO in the prototype flow cell.

Experiment Conclusions.

The above experiments using prototype cell 400 demonstrates that bicarbonate and carbonate can be reduced to CO in flow cells 216, 400 without the supply of gaseous CO$_2$ to the electrolyte. The 3.0-M KHCO3 system without a CO$_2$ feed was observed to have greater (or at least equal) Faradaic efficiency for CO than the CO$_2$-fed solution. The experiments show that: (i) aqueous carbonate, wherein [CO$_2$] is negligible, can be reduced into CO; and (ii) bicarbonate reduction shows strong dependence on [KHCO3] but no dependence on [CO2]. These experimental results highlight a new strategy to convert aqueous bicarbonate and carbonate species directly into valuable commodities without the need to first extract CO$_2$ gas from a bicarbonate or carbonate solution by an energy-intensive thermally-driven decomposition step.

BPM Vs AEM Experimental Testing

In a related experiment using prototype cell 400, an anolyte of 1.0 M KOH was circulated through the stainless flow plate and oxidized into O$_2$ gas. 3.0 M KHCO$_3$ electrolyte solutions bubbled with N$_2$ or CO$_2$ were circulated through the titanium flow plate and reduced into CO at the cathode. The cathodic products were analyzed by gas chromatography (GC). Peristaltic pumps were used to circulate the anolyte and catholyte at 45 mL min$^{-1}$ and 90 mL min$^{-1}$ respectively. Gas flows (N$_2$ or CO$_2$) were set to 160 sccm.

Figure 7A:
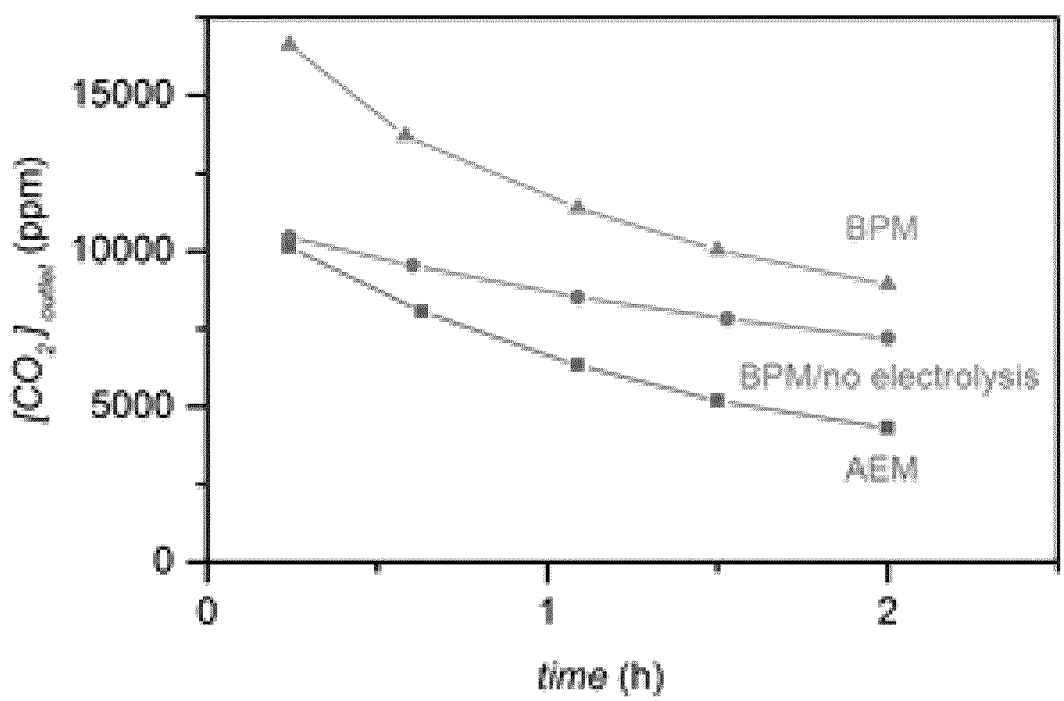
FIG. 7A is a graph showing the concentration of $CO_2$ leaving the flow cell during electrolysis of 3.0 M $KHCO_3$ at 100 mA cm$^{-2}$ with a BPM and an AEM.

FIG. 7A shows the CO$_2$ concentration during a 3 hour experiment during the CO$_2$ reduction reaction (CO$_2$RR) with an AEM and with a BPM, during the hydrogen evolution reaction (HER), and while circulating the 3.0-M KHCO$_3$ catholyte without performing electrolysis to obtain a baseline measurement. The concentration of CO$_2$ measured is enhanced during CO$_2$RR and HER in the presence of a BPM compared to the baseline measurement. The CO$_2$ concentration decreases more slowly in the presence of a BPM, potentially indicating that CO$_2$ is being generated at the membrane.

Figure 7B:
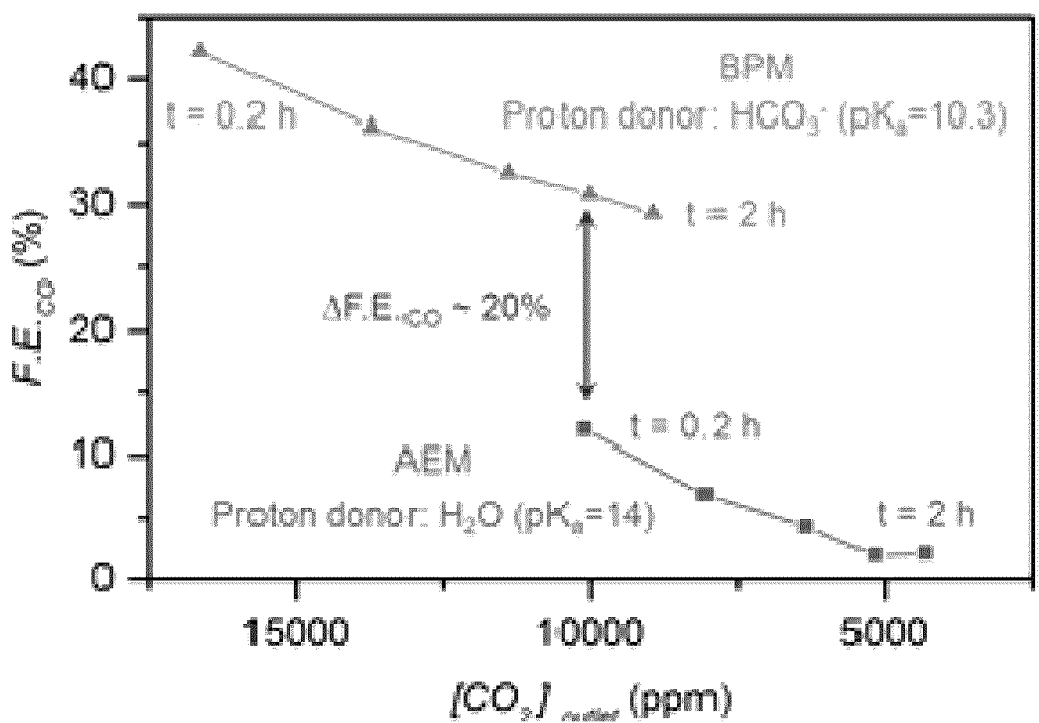
FIG. 7B is a graph showing Faradaic efficiency for CO as a function of $CO_2$ concentration at the outlet during the 2-h electrolysis of a 3.0-M $KHCO_3$ solution at 100 mA cm$^{-2}$ with a BPM and an AEM.
Figure 7C:
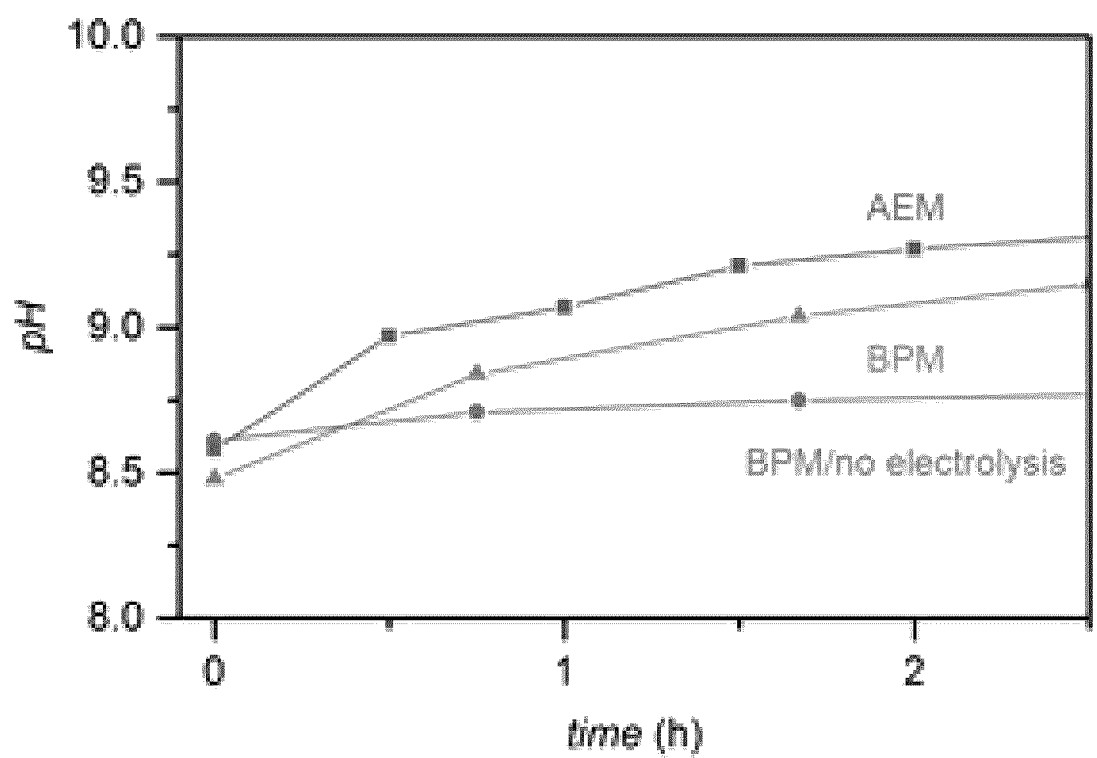
FIG. 7C is a graph showing the pH of bulk solution during electrolysis of 3.0 M $KHCO_3$ at 100 mA cm$^{-2}$ with a BPM or AEM.
Figure 7D:
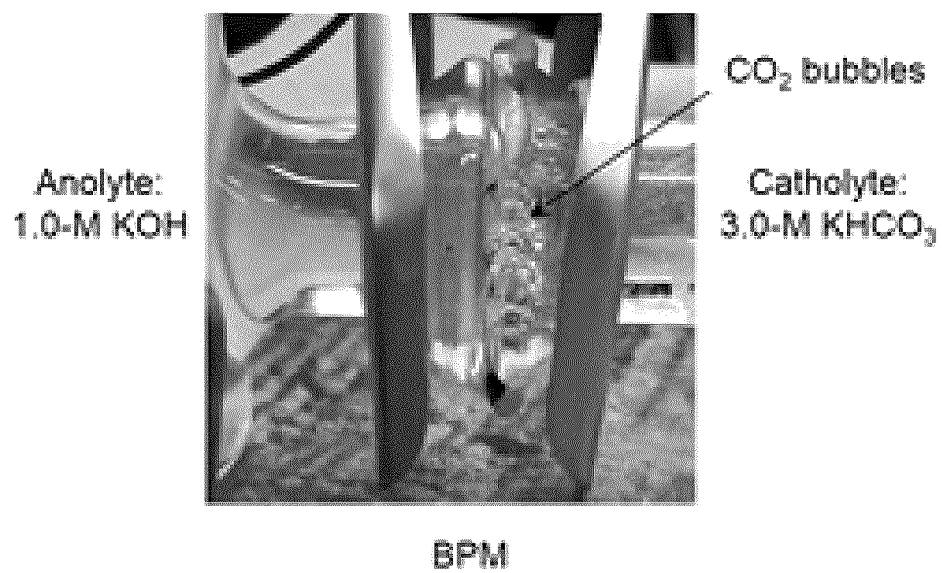
FIG. 7D shows an example flow cell where a BPM separates a silver-coated carbon gas diffusion electrode in the cathodic compartment and a Pt mesh anode in the anodic compartment.

FIG. 7B shows the faradaic efficiency for CO (F.E.$_{CO}$) achieved with an AEM and a BPM. In the presence of the BPM the F.E.$_{CO}$ achieved after 2 hours is ~30%, whereas in the presence of an AEM the F.E.$_{CO}$ achieved after 2 hours is only ~2%. The mechanism of HCO$_3^-$ reduction in a flow-cell architecture is therefore greatly influenced by the BPM. FIG. 7B shows that there is a linear relationship between the concentration of CO$_2$ and F.E.$_{CO}$ in the presence of both a BPM and AEM. At 10000 ppm there is a 20% F.E.$_{CO}$ difference in performance between the AEM and BPM system. This difference may be accounted for by the pH environment within the MEA. FIG. 7C shows the change in bulk pH during CO$_2$RR at 100 mA cm-2 for 3.5 hours with a BPM (circle markings), an AEM (triangle markings), and without an applied current while circulating the 3.0-M KHCO$_3$ catholyte (square markings). Both the BPM and AEM system become more alkaline over time, however, the rate of increase in alkalinity is enhanced in the presence of the AEM. FIG. 7D shows the formation of CO$_2$ bubbles during the electrolysis of HCO$_3^-$ at a current density of 20 mA cm$^{-2}$. FIG. 7D shows that enough CO$_2$ is produced to exceed the solubility limits of CO$_2$ in aqueous media.

In the presence of an AEM, HCO$_3^-$ may act as a shuttle to bring CO$_2$ to the surface. The F.E.$_{CO}$ may be controlled by the equilibrium between HCO$_3^-$ and CO$_2$. The increase in bulk pH may be coupled to the decrease in system performance due to the equilibrium between HCO$_3^-$ and CO$_2$ being pH dependent. When electrolysis occurs in the presence of a BPM, the [CO$_2$] at the catalyst surface is no longer solely dependent on the bulk pH. The proton flux of the BPM in-situ generates CO$_2$ which can be further converted to CO at the cathode. A BPM in the presence of a 3.0-M CO$_3^{2-}$ catholyte may predominantly produce HCO$_3^-$ at the interfacial region between the BPM and the catalyst.

The inventors examined the possibility that the proton flux from the BPM is also responsible for the high F.E.$_{CO}$. The increase of F.E.$_{CO}$ of ~20% between the AEM and BPM (see FIG. 8C) may be attributed to the protons donors available at the catalyst surface. In the presence of a BPM, the proton flux from the BPM regenerates bicarbonate anions from carbonate, whereas with an AEM the hydroxide flux will deplete the surface of bicarbonate anions leaving water as the sole proton donor. The depletion of bicarbonate at the catalytic surface can be implied by the bulk pH increasing more rapidly in the presence of an AEM than a BPM. The AEM must be allowing cross-over of hydroxides from the anode which increases the alkalinity within the MEA. The relative pkA between bicarbonate and water is 6.4 and 14 respectively, making bicarbonate a better proton donor than water. Further, it is possible that protons from the BPM can be directly coupled to the electrosorption of $CO_2$ to the Ag surface. The difference in available protons likely accounts for the change in faradaic efficiency in the presence of an AEM or BPM when similar $CO_2$ concentrations are present.

In addition, there are likely two regions of local chemistry within the MEA: a more acidic region (lower pH) at the membrane-catalyst interface; and a more basic region (higher pH) within the catalyst. In the acidic region, $HCO_3$ and $CO_3^{2-}$ are converted to $CO_2$ and $HCO_3$, respectively. This allows for $CO_2$ to diffuse into the catalyst at high concentrations and a high local basic pH that would not otherwise be possible from sparging $CO_2$ into the bulk catholyte. The basic pH region within the catalyst layer is due to the electrochemical reactions generating $OH^-$. This local region of basic pH offers a unique opportunity for $CO_2$ reduction due the electrochemical reduction potential of water being dependent on pH. As the pH increases, a higher over-potential is required to reduce water. Therefore, the local increase in pH at the catalyst surface may enhance the reduction of carbon species due to the shift in over-potential required to reduce $H_2O$ at pH 8 vs pH 14.

The inventors observe that the proton flux from the BPM in prototype cell 400 enhances CO production from the flow cell by rapidly converting $HCO_3^-$ to $CO_2$ at the membrane interface. Further, the BPM provides protons that can be used as proton donors in the form of $H^+$ or regeneration of $HCO_3^-$ from carbonate. Within the catalyst, the high local pH due to electrolysis inhibits the competitive hydrogen evolution reaction. Exploiting these two regions of local pH through MEA design facilitates tuning conversion of an aqueous $HCO_3^-$ feed to provide mixtures of $CO_2$, $H_2$, and CO in desired ratios.

Additional Experimental Testing

Figure 8:
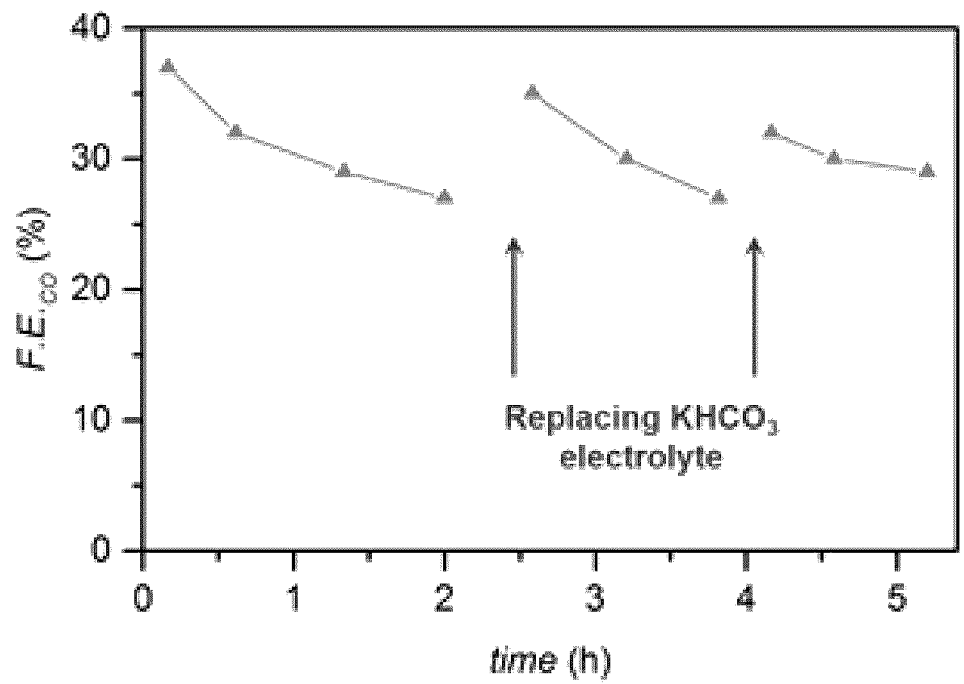
FIG. 8 is a graph showing the temporal change in Faradaic efficiency for CO during a 5-h electrolysis of a $N_2$-saturated 3.0-M $KHCO_3$ solution at 100 mA cm$^{-2}$ with the catholyte being replaced at 2.5 and 4 hours.
Figure 9:
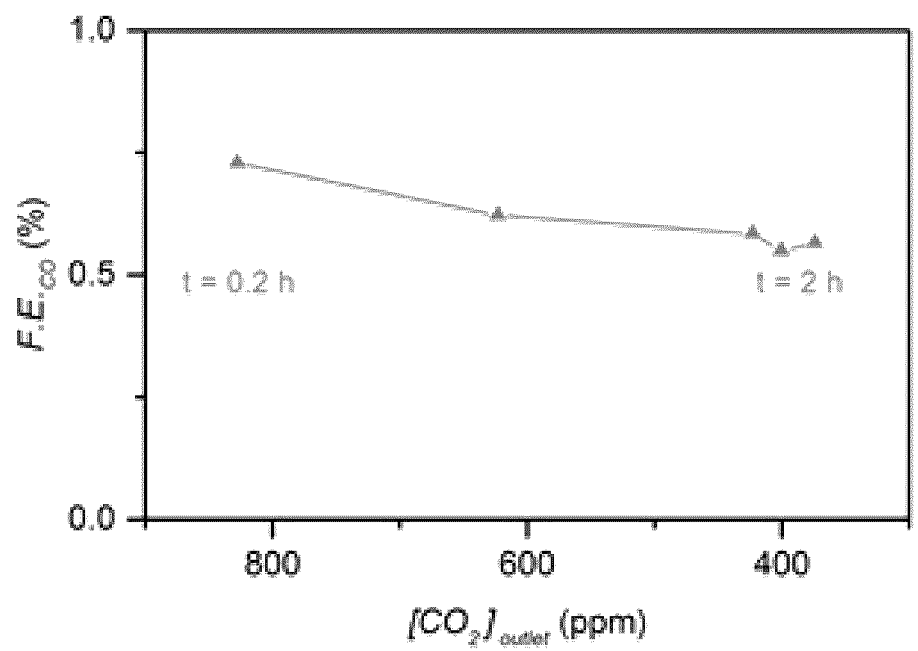
FIG. 9 is a graph showing Faradaic efficiency for CO as a function of $CO_2$ concentration at the outlet of an electrolysis cell comprising a BPM during the 2-h electrolysis of a 3.0-M $K_2CO_3$ solution at 100 mA cm$^{-2}$.
Figure 10:
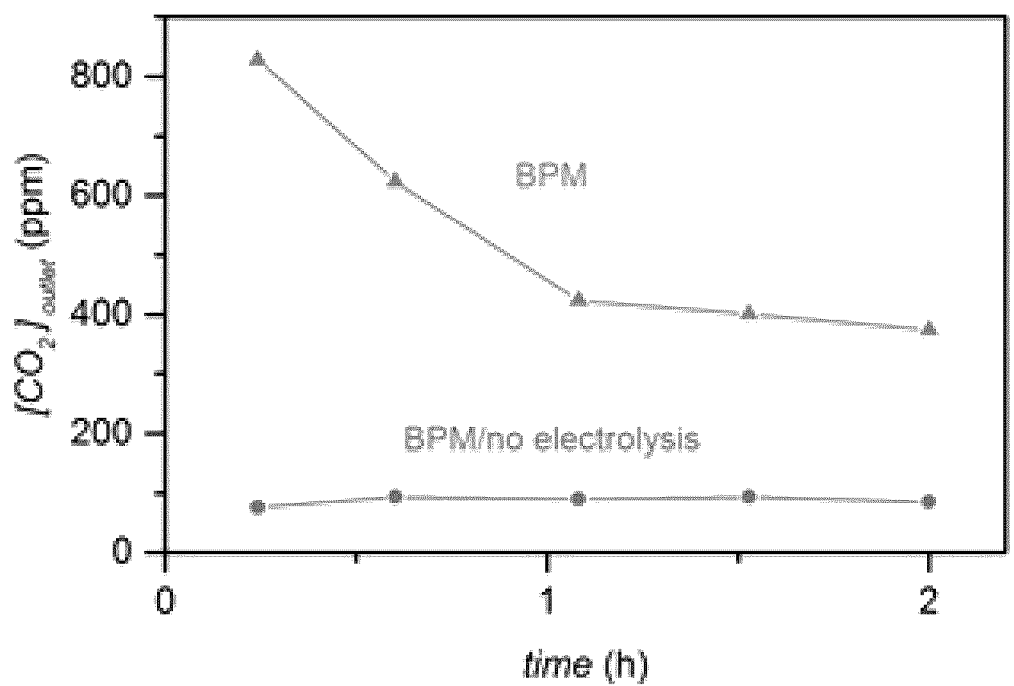
FIG. 10 is a graph showing the temporal change in $CO_2$ concentration at the outlet of an electrolysis cell during electrolysis of 3.0 M $K_2CO_3$ at 100 mA cm$^{-2}$ with and without electrolysis.

In related experiments using prototype cell 400, an anolyte of 1.0 M KOH was circulated through the stainless flow plate and oxidized to yield $O_2$ gas. FIG. 8 is a graph showing the temporal change in $F.E._{CO}$ during a 5-h electrolysis of a $N_2$-saturated 3.0-M $KHCO_3$ solution at 100 mA $cm^{-2}$ with the catholyte being replaced at 2.5 and 4 hours. FIG. 9 is a graph showing $F.E._{CO}$ as a function of $[CO_2]$ at the outlet during the 2-h electrolysis of a 3.0-M $K_2CO_3$ solution at 100 mA $cm^{-2}$ in a flow cell comprising a BPM while the headspace in the flow cell was purged with 160 mL/min $N_2$. FIG. 10 is a graph showing the temporal change in $[CO_2]$ at the outlet of a flow cell during electrolysis of 3.0 M $K_2CO_3$ at 100 mA $cm^{-2}$ with and without electrolysis. The headspace of the cell was purged with $N_2$ at 160 mL/min.

Interpretation of Terms

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements can be physical, logical, or a combination thereof;
"herein", "above", "below", and words of similar import, when used to describe this specification, shall refer to this specification as a whole, and not to any particular portions of this specification;
"or", in reference to a list of two or more items, covers all of the following interpretations of the word: any of the items in the list, all of the items in the list, and any combination of the items in the list;
the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A carbon capture method comprising:
    removing carbon dioxide from a source by absorbing and chemically reacting gaseous carbon dioxide to form bicarbonate and/or carbonate in an aqueous solution;
    supplying a catholyte comprising the aqueous solution at a cathode of an electrochemical reactor comprising an anode and the cathode separated by a bipolar membrane and applying a potential difference between the anode and the cathode to cause an electrochemical reaction yielding product gas comprising one or both of gas phase carbon dioxide and gas phase carbon monoxide, wherein the supplying of the catholyte at the cathode comprises supplying the aqueous solution in the absence of an additional supply of carbon dioxide gas; and
    separating the product gas from the aqueous solution.

2. The method according to claim 1 comprising, at the cathode of the electrochemical reactor, generating hydrogen gas wherein the product gas comprises the hydrogen gas.

3. The method according to claim 1 wherein the aqueous solution comprises bicarbonate at a concentration of at least 3 moles/liter.

4. The method according to claim 1 wherein a current flowing in the electrochemical reactor as a result of the applied potential has a current density at the cathode of at least 100 mA/cm$^2$.

5. The method according to claim 1 wherein the electrochemical reactor is operated at a temperature not exceeding 150° C. and not exceeding a boiling point of the aqueous solution.

6. The method according to claim 1 comprising maintaining a pressure of the aqueous solution at the cathode of the electrochemical reactor at 2 atmospheres or less.

7. The method according to claim 1 comprising flowing the aqueous solution through a cathode chamber of the electrochemical reactor.

8. The method according to claim 1 wherein the aqueous solution has a pH above 7.

9. The method according to claim 8 wherein the aqueous solution comprises a strong base.

10. The method according to claim 8 wherein the pH of the aqueous solution is at least 8.0.

11. The method according to claim 8 wherein the pH of the aqueous solution when supplied for chemically reacting the gaseous carbon dioxide is in the range of 8 to 10.

12. The method according to claim 1 wherein the aqueous solution has a first pH at an input of the electrochemical reactor and a second pH at an output of the electrochemical reactor and the second pH is higher than the first pH.

13. The method according to claim 1 comprising controlling a composition of the product gas by adjusting a magnitude of the potential difference.

14. The method according to claim 13 wherein a concentration of $CO_2$ in the aqueous solution is below 7 mM.

15. The method according to claim 1 wherein the product gas comprises $CO_2$, CO and $H_2$.

16. The method according to claim 15 wherein the product gas comprises no more than 50% $CO_2$.

17. The method according to claim 15 wherein a molar ratio of CO to $H_2$ in the product gas is greater than 1.

18. The method according to claim 15 wherein a molar ratio of CO to $H_2$ in the product gas is less than 1.

19. The method according to claim 1 wherein absorbing and chemically reacting the gaseous carbon dioxide comprises flowing the gaseous carbon dioxide through a filter wetted by the aqueous solution.

20. The method according to claim 1 wherein the aqueous solution comprises a caustic alkaline solution.

21. The method according to claim 1 wherein the aqueous solution comprises an enzyme that is active for promoting the chemical reaction of the carbon dioxide to yield bicarbonate and/or carbonate.

22. The method according to claim 21 wherein the enzyme comprises a carbonic anhydrase enzyme catalyst.

23. The method according to claim 1 comprising circulating the aqueous solution back to absorb and chemically react with more gaseous carbon dioxide after separating the product gas from the aqueous solution.

24. A carbon capture method comprising:
    removing carbon dioxide from a source by absorbing and chemically reacting gaseous carbon dioxide to form bicarbonate and/or carbonate in an aqueous solution;
    supplying a catholyte comprising the aqueous solution at a cathode of an electrochemical reactor comprising an anode and the cathode separated by a bipolar membrane and applying a potential difference between the anode and the cathode, wherein the supplying of the catholyte at the cathode comprises supplying the aqueous solution in the absence of an additional supply of carbon dioxide gas;
    electrochemically dissociating, at the bipolar membrane, water to form hydrogen ions;
    transporting the hydrogen ions towards the cathode;
    reacting the bicarbonate and/or carbonate ions in the aqueous solution with the hydrogen ions to form carbon dioxide gas;
    electrochemically reducing the carbon dioxide gas to form a product gas; and
    separating the product gas from the aqueous solution.

* * * * *